US012384168B2

(12) United States Patent
Somano et al.

(10) Patent No.: US 12,384,168 B2
(45) Date of Patent: Aug. 12, 2025

(54) PRINTING APPARATUS AND PRINTING METHOD

(71) Applicant: CANON KABUSHIKI KAISHA, Tokyo (JP)

(72) Inventors: Toshiaki Somano, Tokyo (JP); Kosuke Yamamoto, Yokohama (JP); Norio Sakurai, Tokyo (JP); Yuki Emoto, Tokyo (JP); Kentaro Muro, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 21 days.

(21) Appl. No.: 18/504,606

(22) Filed: Nov. 8, 2023

(65) Prior Publication Data

US 2024/0100862 A1 Mar. 28, 2024

Related U.S. Application Data

(63) Continuation of application No. 17/243,703, filed on Apr. 29, 2021, now Pat. No. 11,845,263, which is a (Continued)

(30) Foreign Application Priority Data

May 31, 2018 (JP) ................................ 2018-104789

(51) Int. Cl.
*B41J 11/00* (2006.01)
*B41J 13/00* (2006.01)
(Continued)

(52) U.S. Cl.
CPC ....... *B41J 11/0005* (2013.01); *B41J 13/0036* (2013.01); *B41J 13/009* (2013.01);
(Continued)

(58) Field of Classification Search
CPC .. B65H 43/08; B65H 2553/612; B65H 43/06; B65H 2511/20; B65H 2511/414;
(Continued)

(56) References Cited

U.S. PATENT DOCUMENTS

| | | | |
|---|---|---|---|
| 7,452,043 B2 | 11/2008 | Ono et al. |
| 11,020,988 B2 | 6/2021 | Somano et al. |

(Continued)

FOREIGN PATENT DOCUMENTS

| | | |
|---|---|---|
| JP | 2006-137610 A | 6/2006 |
| JP | 2007-307763 A | 11/2007 |

(Continued)

OTHER PUBLICATIONS

U.S. Appl. No. 16/423,354, filed May 28, 2019 (First Named Inventor: Norio Sakurai).

(Continued)

*Primary Examiner* — Jason S Uhlenhake
*Assistant Examiner* — Alexander D Shenderov
(74) *Attorney, Agent, or Firm* — Venable LLP

(57) ABSTRACT

Provided is a technique that enables proper sorting of discharged print media by suppressing curling of each of the print media sufficiently. A determining unit determines a curling suppressing operation to be executed such that in a case where sorting operation is executed, the suppressing operation having a higher effect of suppressing curling is executed than in a case where the sorting operation is executed. Then, a print control unit controls a print head to perform printing on print media while executing the suppressing operation determined by the determining unit.

22 Claims, 17 Drawing Sheets

Related U.S. Application Data continuation of application No. 16/416,483, filed on May 20, 2019, now Pat. No. 11,020,988.

(51) Int. Cl.

| | |
|---|---|
| ***B41J 13/02*** | (2006.01) |
| ***B41J 13/10*** | (2006.01) |
| ***B41J 29/38*** | (2006.01) |
| ***B65H 33/08*** | (2006.01) |

(52) U.S. Cl.

CPC ............. *B41J 13/02* (2013.01); *B41J 13/106* (2013.01); *B41J 29/38* (2013.01); *B65H 33/08* (2013.01); *B65H 2301/51256* (2013.01); *B65H 2405/351* (2013.01); *B65H 2511/15* (2013.01)

(58) Field of Classification Search

CPC .... B65H 43/00; B65H 29/68; B65H 2515/81; B65H 2513/53; B65H 2513/108; B65H 2513/512; B65H 2513/10; B65H 2801/06; B65H 29/00; B41J 2/16535; B41J 2/16588; B41J 2/16508; B41J 2/195

USPC .......................................................... 347/104

See application file for complete search history.

(56) References Cited

U.S. PATENT DOCUMENTS

| | | | |
|---|---|---|---|
| 2009/0073211 | A1 | 3/2009 | Imoto |
| 2013/0257964 | A1 | 10/2013 | Itogawa |
| 2015/0239702 | A1 | 8/2015 | Sugiyama et al. |

FOREIGN PATENT DOCUMENTS

| | | | |
|---|---|---|---|
| JP | 2009-286513 | A | 12/2009 |
| JP | 2013-208809 | A | 10/2013 |
| JP | 2015-160695 | A | 9/2015 |
| JP | 2016-190394 | A | 11/2016 |

OTHER PUBLICATIONS

U.S. Appl. No. 16/423,361, filed May 28, 2019 (First Named Inventor: Yuki Emoto).

U.S. Appl. No. 16/420,393, filed May 23, 2019 (First Named Inventor: Yuki Emoto).

Office Action dated Apr. 5, 2022, in Japanese Patent Application No. 2018-104789.

| FIRST SENSOR 215a | SECOND SENSOR 215b | STACK AMOUNT |
|---|---|---|
| OFF | OFF | LESS THAN 14 mm |
| ON | OFF | 14 mm OR MORE AND LESS THAN 33 mm (NEARLY FULL STACK) |
| ON | ON | 33 mm or MORE (FULL STACK) |
| OFF | ON | ARM RETRACTED |
FIG.12A
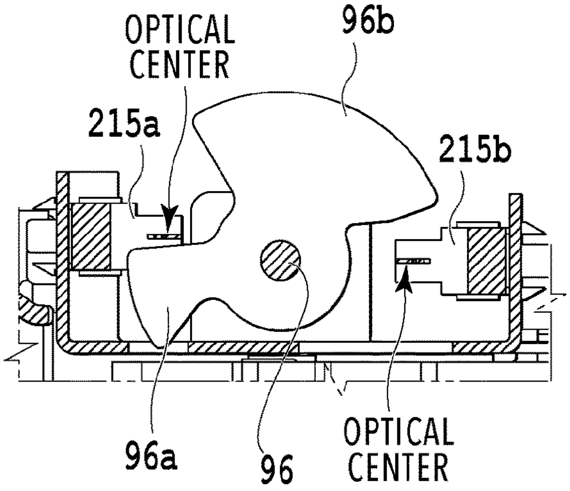
FIG.12B
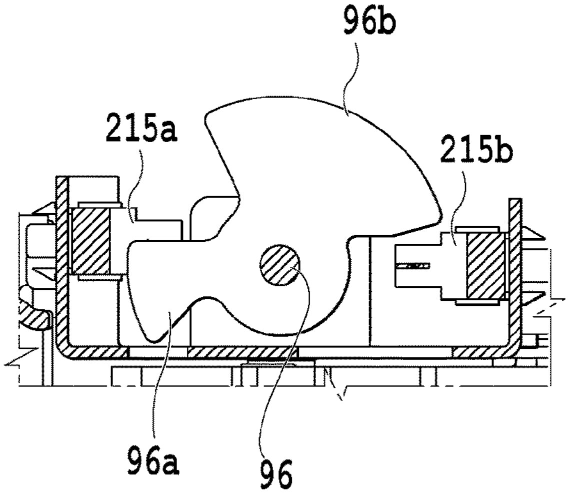
FIG.12C
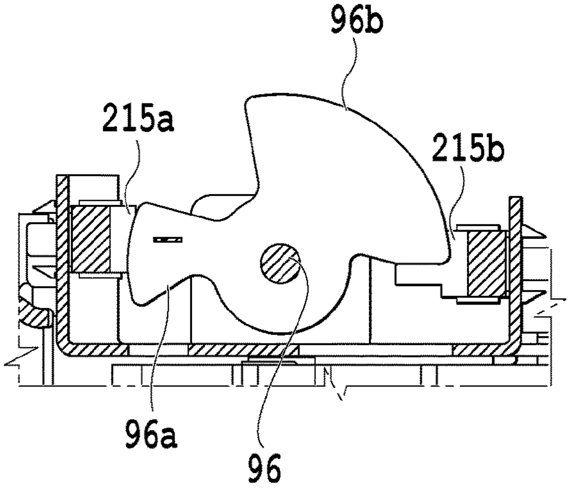
FIG.12D
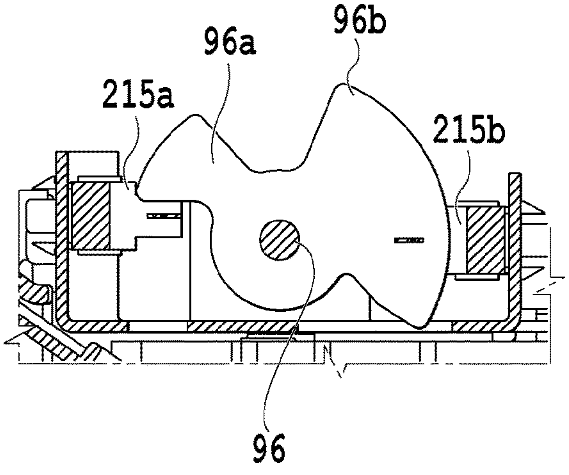
FIG.12E

| SUB-AREA IN SPECIFIED AREA S0 | WEIGHTING COEFFICIENT |
|---|---|
| SUB-AREA S1 | 4 |
| SUB-AREA S2 | 3 |
| SUB-AREA S3 | 2 |
| SUB-AREA S4 | 1 |

| CORRECTION VALUE BASED ON TYPE OF PRINT MEDIUM | |
|---|---|
| TYPE OF SHEET | VALUE |
| THIN PAPER | 40 |
| PLAIN PAPER | 30 |
| THICK PAPER | 50 |
| RECYCLED PAPER | 50 |
| POST CARD | 0 |
| ENVELOPE | 0 |

FIG.15A

| CORRECTION VALUE BASED ON TEMPERATURE AND HUMIDITY ENVIRONMENT | | HUMIDITY (%) [H] | | |
|---|---|---|---|---|
| | | H > 50 | 50 ≥ H > 20 | 20 ≥ H |
| TEMPERATURE (°C) [S] | S > 25 | -80 | -80 | -80 |
| | 25 ≥ S > 15 | -80 | -10 | -10 |
| | 15 ≥ S | -80 | -10 | 50 |

FIG.15B

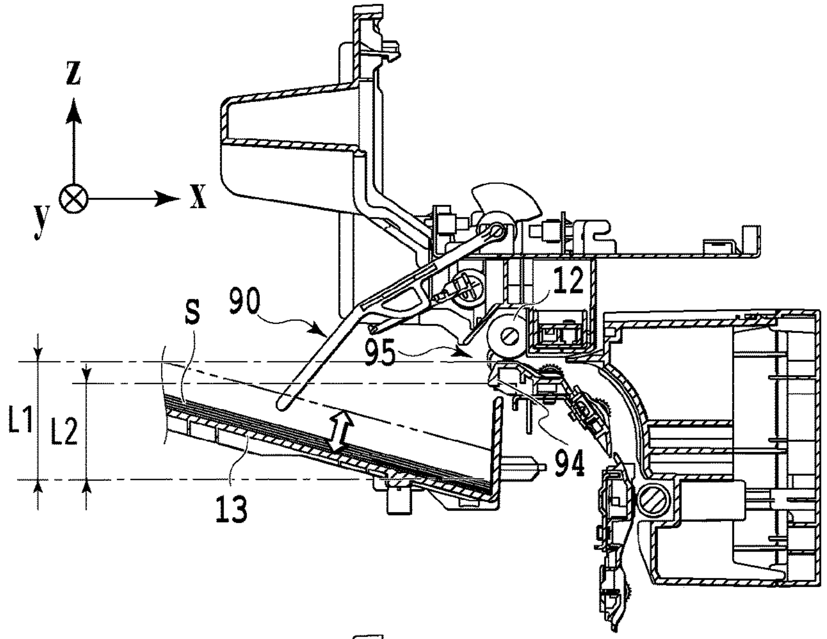
FIG.16A
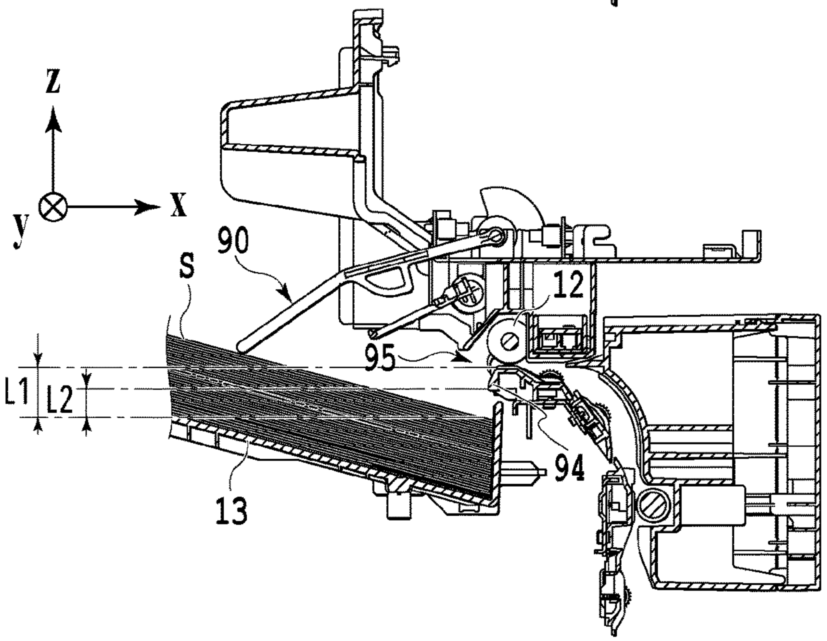
FIG.16B
| CORRECTION VALUE BASED ON STACK AMOUNT AND SORTING INFORMATION | | |
|---|---|---|
| STACK AMOUNT | NO SORTING | SORTING |
| LESS THAN 14 mm | 0 | 20 |
| 14 mm OR MORE | 30 | 50 |
FIG.16C

PRINTING APPARATUS AND PRINTING METHOD

This is a continuation of U.S. patent application Ser. No. 17/243,703, filed Apr. 29, 2021, which is a continuation of U.S. patent application Ser. No. 16/416,483, filed May 20, 2019, now U.S. Pat. No. 11,020,988.

BACKGROUND OF THE INVENTION

Field of the Invention

The present invention relates to printing apparatuses and printing methods in which print media after printing are sorted and stacked when discharged.

Description of the Related Art

Japanese Patent Laid-Open No. 2007-307763 discloses a technique for performing an operation of suppressing curling of a print medium caused by printing according to the type of print medium, the size of the printed area of the print medium, the ratio of the margin, and the humidity. Also, Japanese Patent Laid-Open No. 2006-137610 discloses a technique for sorting print media into stacks each having a specified number of sheets by moving a stacking unit (delivery tray), on which print media are stacked, to shift the discharged print media in the direction intersecting the discharging direction.

In a case where a print medium has a large curl, the print medium tends to come into contact with a member disposed fixedly or the like. In this state, in a case where sorting operation is performed using a movable tray as in the technique disclosed in Japanese Patent Laid-Open No. 2006-137610, the print medium may move on the tray along with the movement of the tray, and this may make it impossible to sort discharged print media properly.

SUMMARY OF THE INVENTION

The present invention provides a technique capable of suppressing curling of the print medium to sort the discharged print medium properly even in a case of using a tray to sort print media after printing.

In the first aspect of the present invention, there is provided a printing apparatus comprising:

a print head configured to apply ink to a print medium to perform printing;

a conveying unit configured to convey a print medium;

an obtaining unit configured to obtain information on whether a stacking unit is to execute sorting operation, the stacking unit including a stacking surface on which a print medium printed by the print head and discharged by the conveying unit is stacked, the stacking unit being capable of executing the sorting operation for a stacked print medium by moving a movable portion that is movable part of the stacking surface, in a direction along the stacking surface; and a determining unit configured to determine, based on the information, execution of suppressing operation that suppresses curling of a print medium to be discharged on the stacking unit, wherein the determining unit determines execution of the suppressing operation that suppresses curling of a print medium to a higher extent in a case where the sorting operation is executed than an extent to which curling of a print medium is suppressed in a case where the sorting operation is not executed.

In the second aspect of the present invention, there is provided a printing apparatus comprising:

a print head configured to apply ink to a print medium to perform printing;

a conveying unit configured to convey a print medium;

an obtaining unit configured to obtain information on whether a stacking unit is to execute sorting operation, the stacking unit including a stacking surface on which a print medium printed by the print head and conveyed by the conveying unit is stacked, the stacking unit being capable of executing the sorting operation for a stacked print medium by moving a movable portion that is movable part of the stacking surface, in a direction along the stacking surface; and a control unit configured to control the conveying unit based on the information, wherein the control unit causes the conveying unit to convey a print medium such that a retention period for which the print medium is retained within a conveying path through which the print medium is conveyed is longer in a case where the sorting operation is executed than in a case where the sorting operation is not executed.

In the third aspect of the present invention, there is provided a printing method comprising:

printing by applying ink to a print medium;

conveying a print medium; and stacking a print medium printed, conveyed, and discharged onto a stacking unit including a stacking surface, wherein in a case of executing sorting operation of sorting a stacked print medium by moving a movable portion that is movable part of the stacking surface, in a direction along the stacking surface, curling of a print medium being conveyed to the stacking unit is suppressed to a higher extent than in a case where the sorting operation is not executed.

The present invention makes it possible to suppress curling of the print medium to sort the discharged print medium properly even in a case of using a tray to sort print media after printing.

Further features of the present invention will become apparent from the following description of exemplary embodiments with reference to the attached drawings.

BRIEF DESCRIPTION OF THE DRAWINGS

FIGS. 12A, 12B, 12C, 12D, and 12E are diagrams showing detection results of sensors and the states for the detection results;

FIGS. 15A and 15B are diagrams for explaining correction values based on the type of print medium and the temperature and humidity environment;

FIGS. 16A, 16B, and 16C are diagrams for explaining correction values based on a stack amount and whether to execute the sorting operation.

DESCRIPTION OF THE EMBODIMENTS

Hereinafter, embodiments of the present invention will be described with reference to the drawings.

Figure 1:
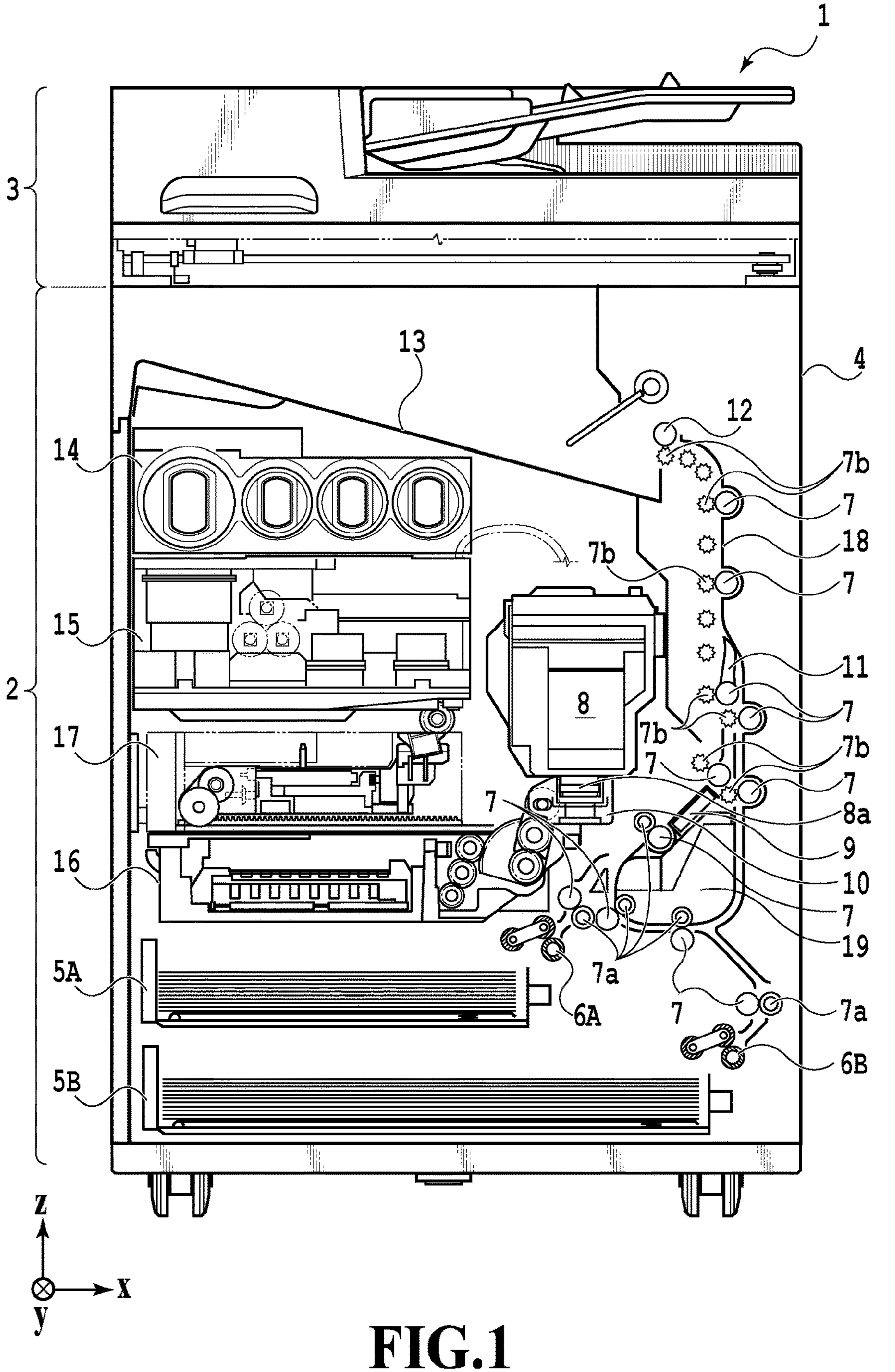
FIG. 1 is a view of a printing apparatus in a standby state.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing printing medium (cut sheets) S are detachably provided at the bottom of a casing 4 in the vertical direction. Relatively small printing medium of up to A4 size are stacked and housed in the first cassette 5A and relatively large printing medium of up to A3 size are stacked and hosed in the second cassette 5B. A first feeding unit 6A for feeding housed printing medium one by one is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are turned while nipping a print medium S together with the conveying rollers 7. The discharging roller 12 is a drive roller located downstream of the conveying rollers 7 and driven by the conveying motor (not shown). The spurs 7*b* nip and convey a print medium S together with the conveying rollers 7 and discharging roller 12 located downstream of the print head 8.

The printing apparatus 1 has multiple motors for driving the above drive rollers, and each drive roller is connected to one of the motors. The relationship between the motors and the drive roller will be described later in detail.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 (stacking unit) is a tray for stacking and housing printing medium S that were subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. That is, the print head 8 is configured to eject inks of a plurality of colors. When the print head 8 is in a standby position, an ejection opening surface 8*a* of the print head 8 is oriented vertically downward and capped with a cap unit 10 as shown in FIG. 1. In print operation, the orientation of the print head 8 is changed by a print controller 202 described later such that the ejection opening surface 8*a* faces a platen 9. The platen 9 includes a flat plate extending in the y-direction and supports a print medium S being subjected to print operation by the print head 8 from the back side. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
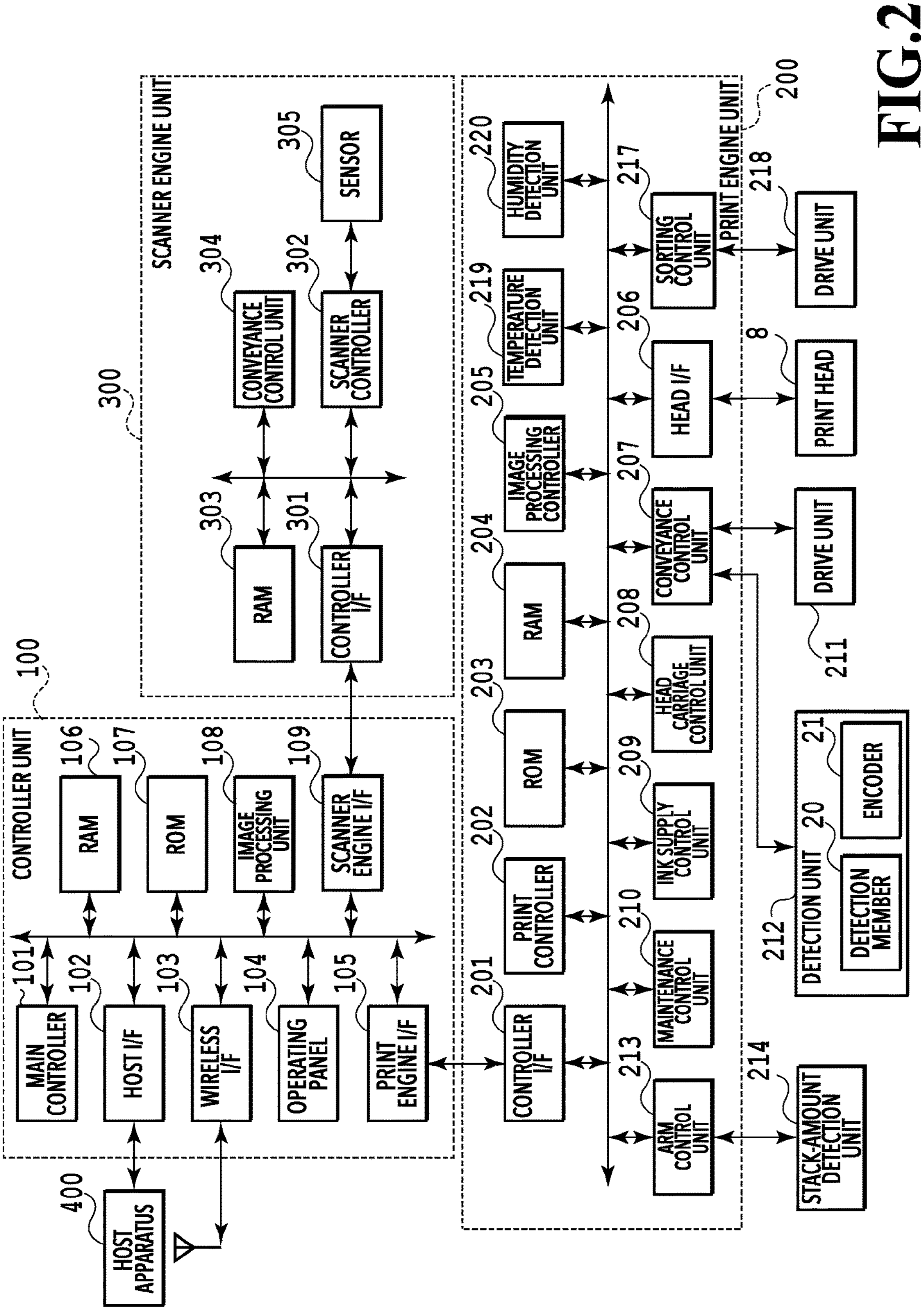
FIG. 2 is a diagram of a control configuration of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine OF 109.

An operating panel 104 is a mechanism for the user to give and receive input and output to and from the printing apparatus 1. Via the operating panel 104, the user can give instructions for operations, such as copying and scanning, set the print mode, and receive information from the printing apparatus 1. The user can set via the operating panel 104 whether to execute a sorting operation for discharging sheets with the sheets sorted into stacks each having a specified number of sheets in copying. Note that for printing based on a print job inputted from the host apparatus 400, setting for sorting operation is made at the host apparatus 400. In the present embodiment, copying operation on print media S performed by the print unit 2 based on information that the scanner unit 3 scans and printing operation on print media S performed by the print unit 2 based on information inputted from the host apparatus 400 are simply called "printing" as appropriate.

For example, in a case where copying operation is selected on the operating panel 104 (input panel), a button for setting the sorting operation appears along with buttons for setting the magnification and other settings, and whether to execute the sorting operation is set according to the selection of the button. The host apparatus 400 opens a window of printer properties with which detailed setting related to printing can be made. Whether to execute the sorting operation is set by checking the checkbox displayed in this window. In other words, in the present embodiment, the host apparatus 400 serves as an external apparatus to which setting of the sorting operation can be inputted.

In the print engine unit 200, the print controller 202 including a CPU controls various mechanisms of the print unit 2 using a RAM 204 as a work area in accordance with various parameters and programs stored in a ROM 203. When various commands and image data are received via a controller OF 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head OF 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

The conveyance control unit 207, connected to the detection unit 212 for detecting the conveyance state of the printing medium S and the drive unit 211 for driving the drive rollers, controls the conveyance of the printing medium S using the drive unit 211, based on detection results obtained from the detection unit 212. The detection unit 212 has the detection members 20 for detecting the printing medium S and the encoders 21 for detecting the amount of rotation of the drive rollers.

Printing is performed in the course of the conveyance of the printing medium S by the conveyance control unit 207, by the print head 8 performing print operation under instructions from the print controller 202.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

An arm control unit 213 drives a flapper 91 (described later) to control the rotation of an arm 90 (described later) and thus moves the arm 90 to an evacuation position or a detecting position. The arm control unit 213 is connected to a stack-amount detection unit 214 for detecting a stack amount of print media S on the discharging tray 13 based on the displacement (rotation) of the arm 90. A sorting control unit 217 controls the movement of a movable tray 13*b* (described later), which is part of the discharging tray 13, via a drive unit 218 to sort print media S being discharged. A temperature detection unit 219 (temperature detection unit) detects the temperature of the environment where the printing apparatus 1 is disposed. A humidity detection unit 220 (humidity detection unit) detects the humidity of the environment where the printing apparatus 1 is disposed. Note that the temperature detection unit 219 and the humidity detection unit 220 may detect the temperature and humidity inside the printing apparatus 1.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller OF 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
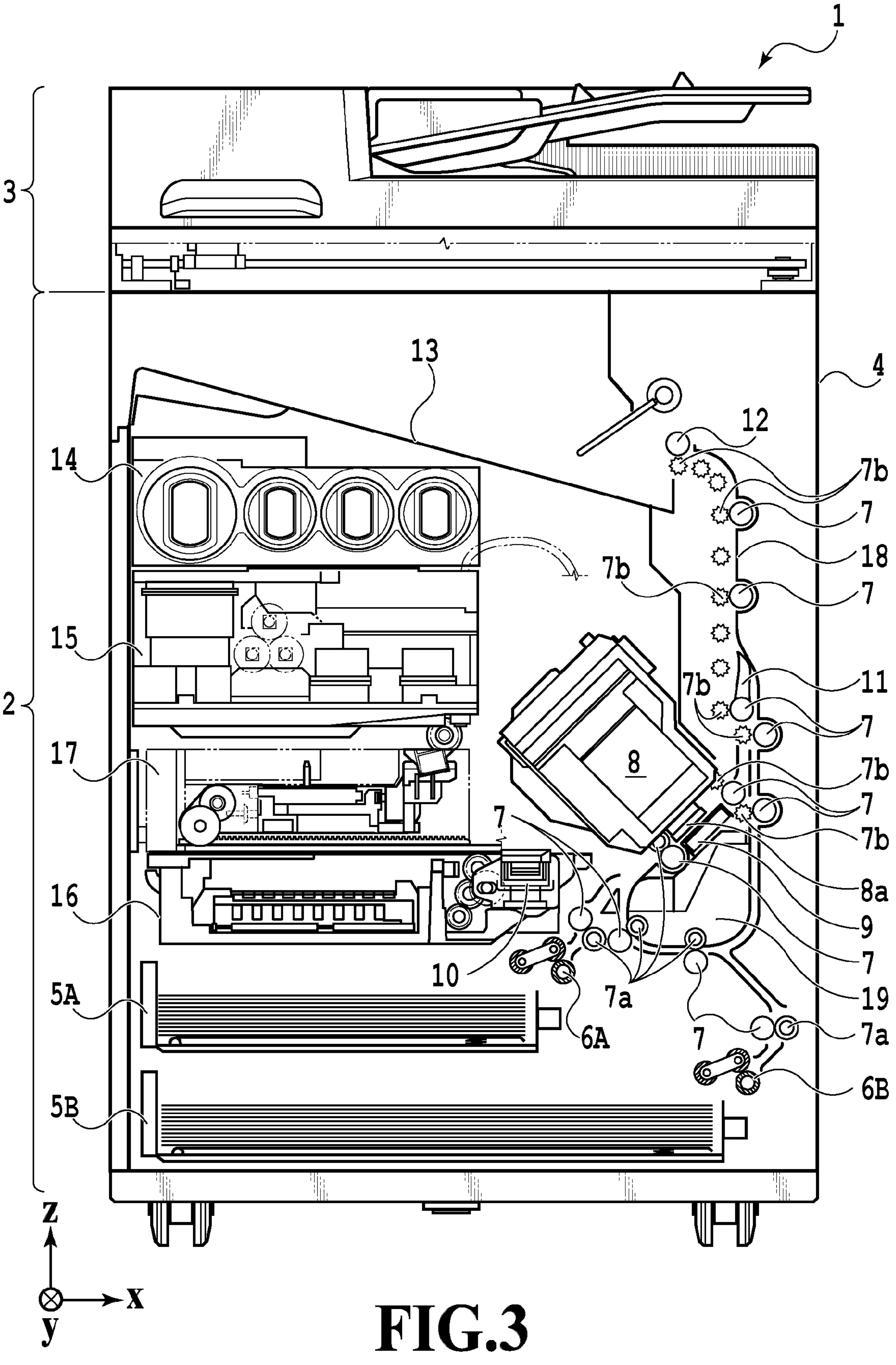
FIG. 3 is a view of the printing apparatus in a print state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined about 45° with respect to the horizontal plane. The ejection opening surface 8*a* of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 45° while adjusting the vertical height of the print head 8 such that the ejection opening surface 8*a* faces the platen 9. After the completion of print operation, the print controller 202 reverses the above procedure to move the print head 8 from the printing position to the standby position.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

Figure 4C:
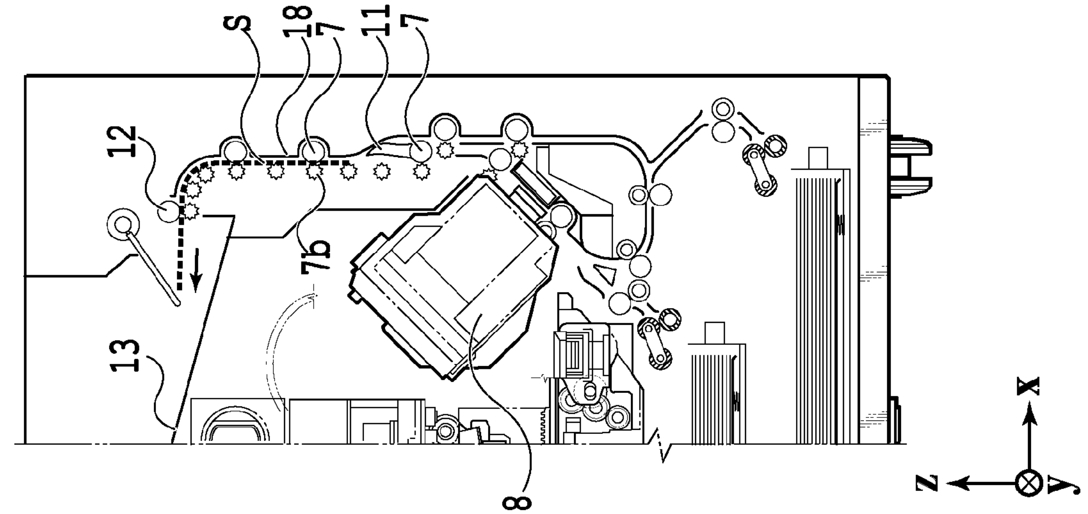
FIG. 4A, FIG. 4B, and FIG. 4C are views of a conveying path of a print medium fed from a first cassette.
Figure 4B:
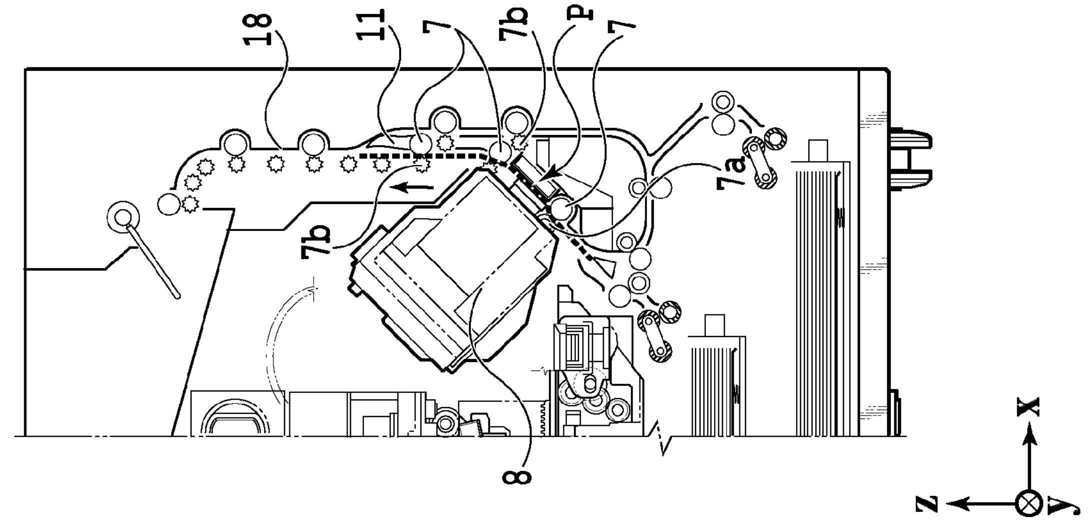
Figure 4A:
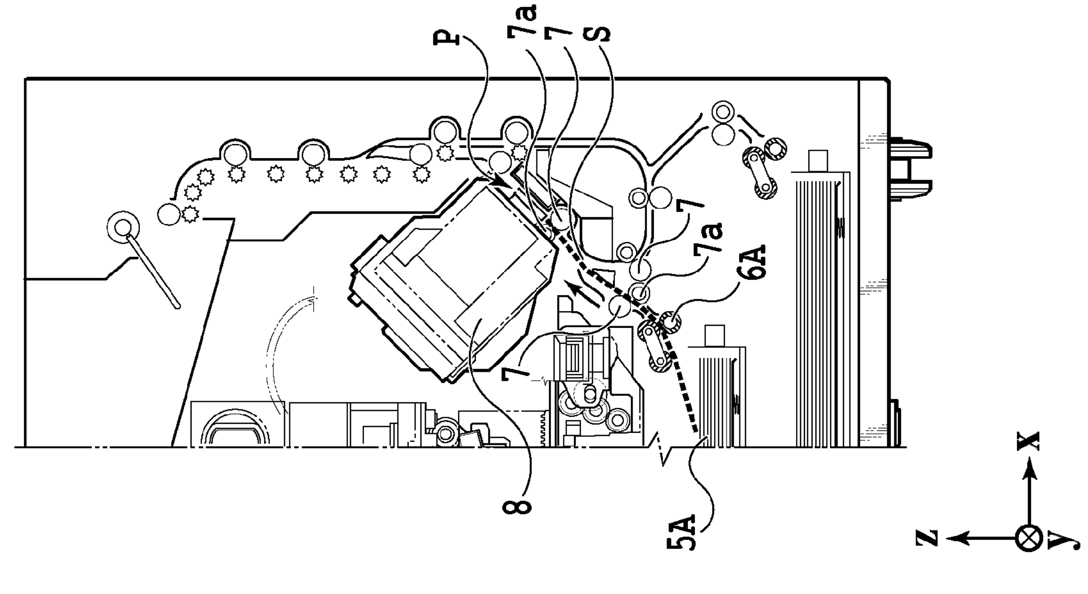

FIGS. 4A to 4C are diagrams showing a conveying path in the case of feeding an A4 size print medium S from the first cassette 5A. A print medium S at the top of a stack of printing medium in the first cassette 5A is separated from the rest of the stack by the first feeding unit 6A and conveyed toward a print area P between the platen 9 and the print head 8 while being nipped between the conveying rollers 7 and the pinch rollers 7*a*. FIG. 4A shows a conveying state where the leading edge of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8*a* and the print medium S. After ink is applied to the print medium S, the conveying rollers 7 and the spurs 7*b* guide the print medium S such that the print medium S passes on the left of the flapper 11 with its tip inclined to the right and is conveyed along the guide 18 in the vertically upward direction of the printing apparatus 1. FIG. 4B shows a state where the leading edge of the print medium S has passed through the print area P and the print medium S is being conveyed vertically upward. The conveying rollers 7 and the spurs 7*b* change the direction of movement of the print medium S from the direction inclined about 45° with respect to the horizontal direction in the print area P to the vertically upward direction.

After being conveyed vertically upward, the print medium S is discharged into the discharging tray 13 by the discharging roller 12 and the spurs 7*b*. FIG. 4C shows a state where the leading edge of the print medium S has passed through the discharging roller 12 and the print medium S is being discharged into the discharging tray 13. The discharged print medium S is held in the discharging tray 13 with the side on which an image was printed by the print head 8 down.

Figure 5C:
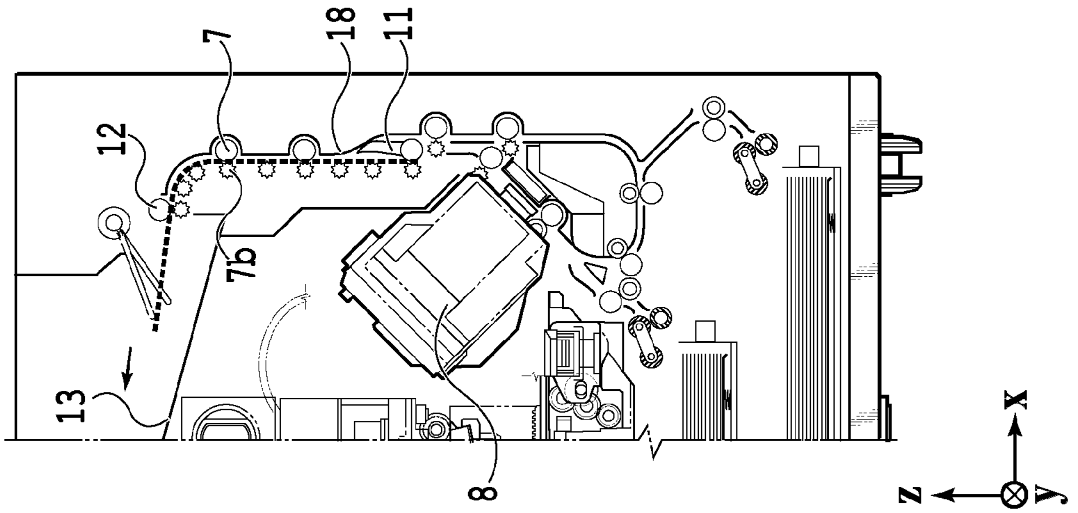
FIG. 5A, FIG. 5B, and FIG. 5C are views of a conveying path of a print medium fed from a second cassette.
Figure 5B:
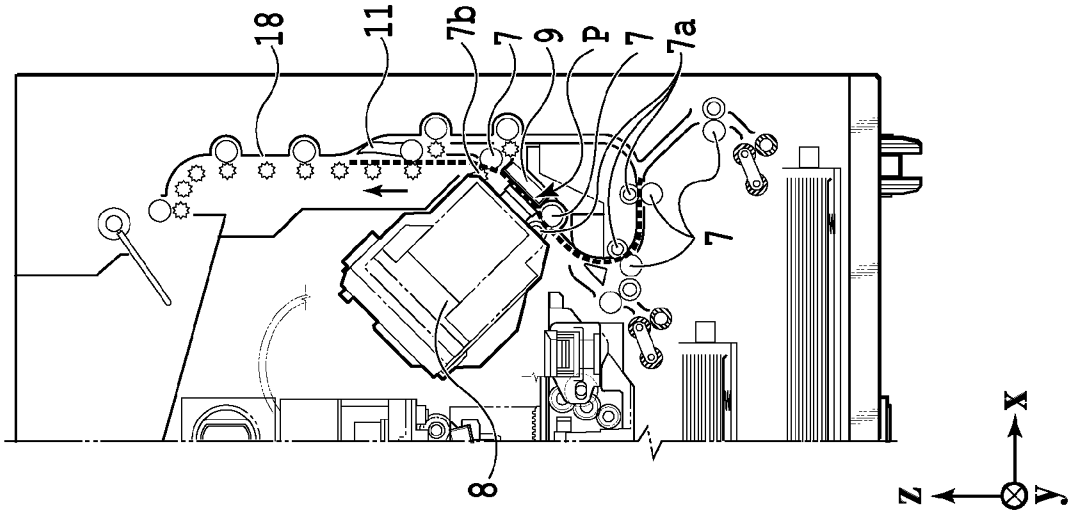
Figure 5A:
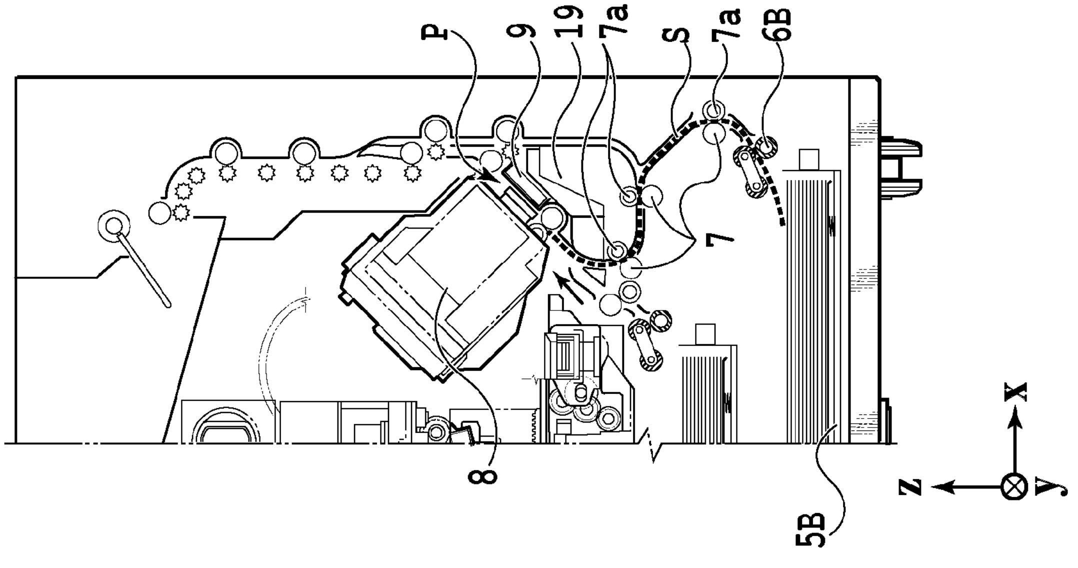

FIGS. 5A to 5C are diagrams showing a conveying path in the case of feeding an A3 size print medium S from the second cassette 5B. A print medium S at the top of a stack of printing medium in the second cassette 5B is separated from the rest of the stack by the second feeding unit 6B and conveyed toward the print area P between the platen 9 and the print head 8 while being nipped between the conveying rollers 7 and the pinch rollers 7*a*.

FIG. 5A shows a conveying state where the leading edge of the print medium S is about to reach the print area P. In a part of the conveying path, through which the print medium S is fed by the second feeding unit 6B toward the print area P, the plurality of conveying rollers 7, the plurality of pinch rollers 7*a*, and the inner guide 19 are provided such that the print medium S is conveyed to the platen 9 while being bent into an S-shape.

The rest of the conveying path is the same as that in the case of the A4 size print medium S shown in FIGS. 4B and 4C. FIG. 5B shows a state where the leading edge of the print medium S has passed through the print area P and the print medium S is being conveyed vertically upward. FIG. 5C shows a state where the leading edge of the print medium S has passed through the discharging roller 12 and the print medium S is being discharged into the discharging tray 13.

FIGS. 6A to 6D show a conveying path in the case of performing print operation (duplex printing) for the back side (second side) of an A4 size print medium S. In the case of duplex printing, print operation is first performed for the first side (front side) and then performed for the second side (back side). A conveying procedure during print operation for the first side is the same as that shown in FIGS. 4A to 4C and therefore description will be omitted. A conveying procedure subsequent to FIG. 4C will be described below.

Figures 6A, 6B, 6C, 6D:
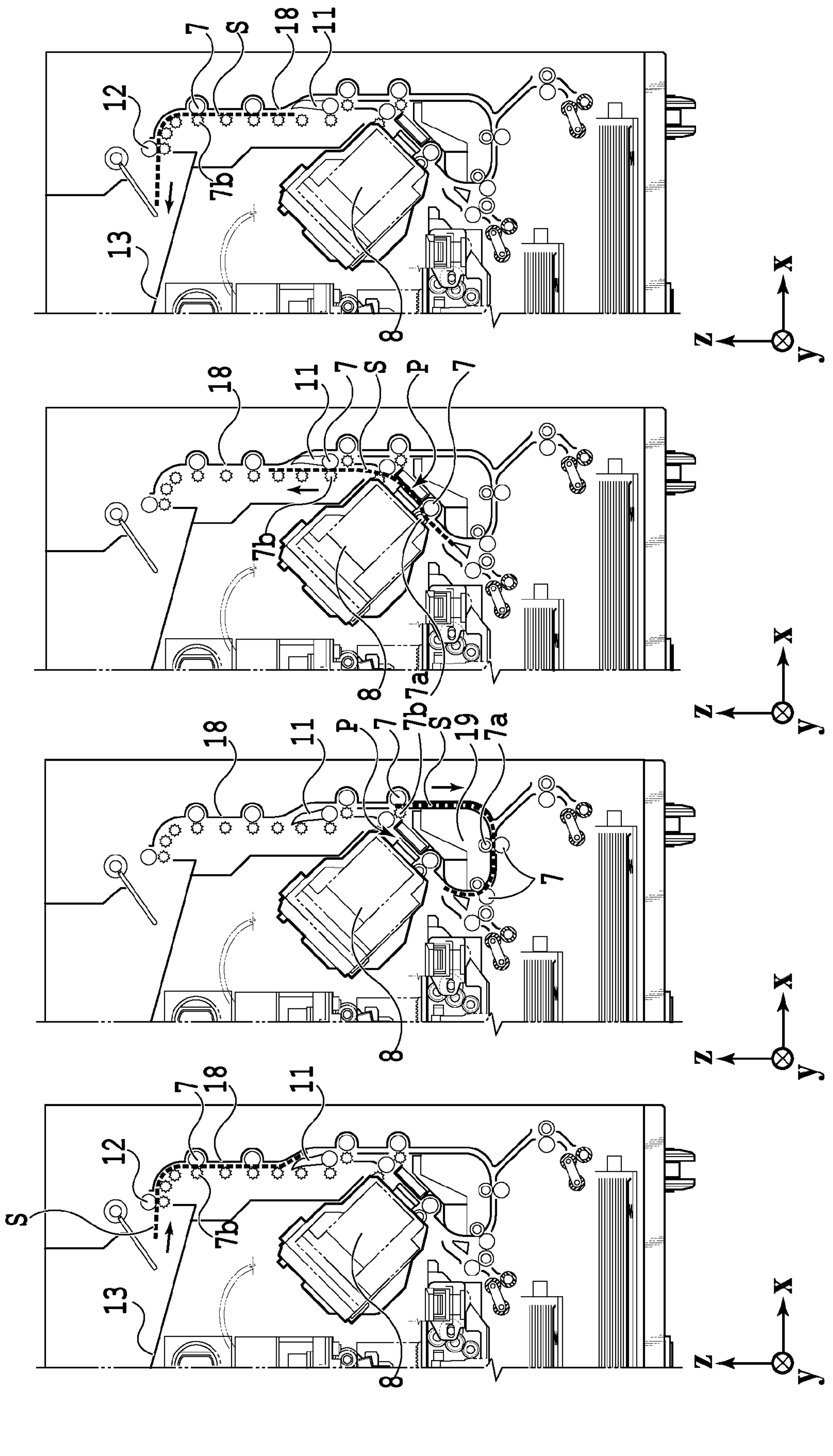
FIG. 6A, FIG. 6B, FIG. 6C, and FIG. 6D are views of views of a conveying path used in a case of performing a print operation on the back surface of a print medium.

After the print head 8 finishes print operation for the first side and the trailing edge of the print medium S passes by the flapper 11, the print controller 202 turns the conveying rollers 7 backward to convey the print medium S into the printing apparatus 1. At this time, since the flapper 11 is controlled by an actuator (not shown) such that the tip of the flapper 11 is inclined to the left, the leading edge of the print medium S (corresponding to the trailing edge during the print operation for the first side) passes on the right of the flapper 11 and is conveyed vertically downward. FIG. 6A shows a state where the leading edge of the print medium S (corresponding to the trailing edge during the print operation for the first side) is passing on the right of the flapper 11.

Then, the print medium S is conveyed along the curved outer surface of the inner guide 19 and then conveyed again to the print area P between the print head 8 and the platen 9. At this time, the second side of the print medium S faces the ejection opening surface 8*a* of the print head 8. FIG. 6B shows a conveying state where the leading edge of the print medium S is about to reach the print area P for print operation for the second side.

The rest of the conveying path is the same as that in the case of the print operation for the first side shown in FIGS. 4B and 4C. FIG. 6C shows a state where the leading edge of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the leading edge of the print medium S has passed through the discharging roller 12 and the print medium S is being discharged into the discharging tray 13.

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 7:
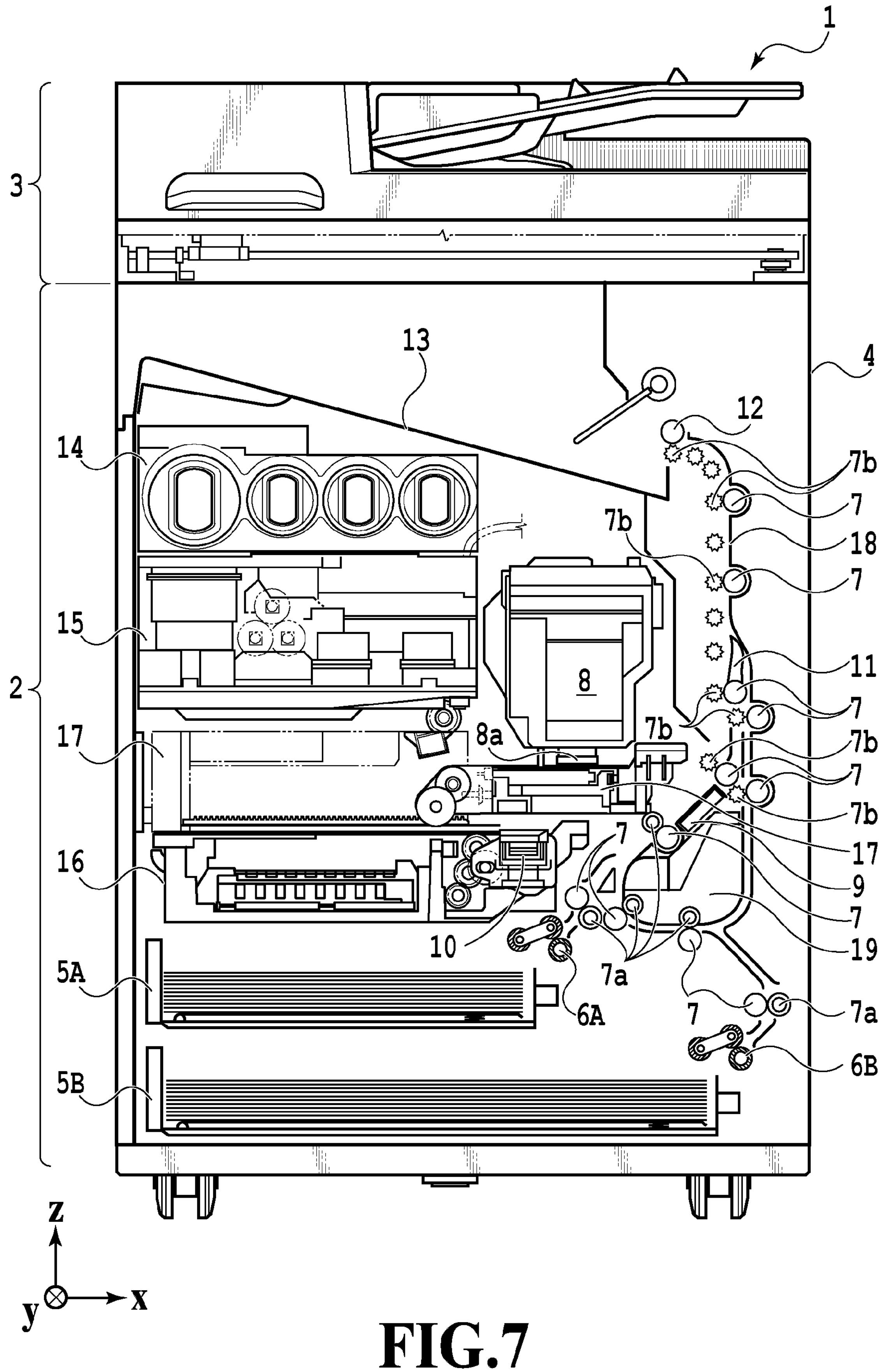
FIG. 7 is a view of the printing apparatus in a maintenance state.

FIG. 7 is a diagram showing the printing apparatus 1 in a maintenance state. In the case of moving the print head 8 from the standby position shown in FIG. 1 to a maintenance position shown in FIG. 7, the print controller 202 moves the print head 8 vertically upward and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed.

Figure 8:
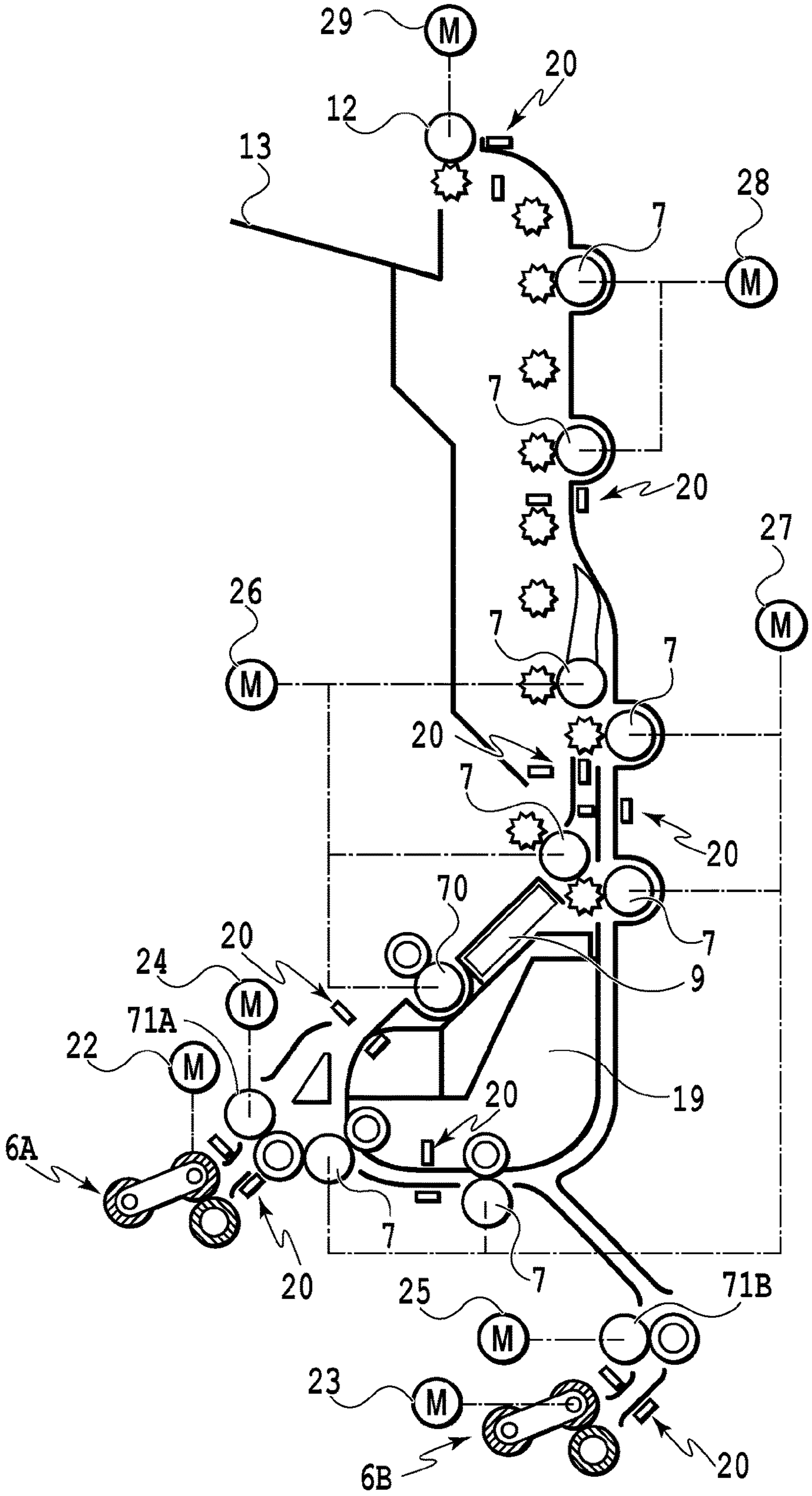
FIG. 8 is a diagram illustrating the correspondence relationship between drive rollers and motors.

FIG. 8 is a diagram illustrating the correspondence relationship between the multiple motors and drive rollers in the printing apparatus 1. A first feeding motor 22 drives the first feeding unit 6A for feeding print media S from the first cassette 5A. A second feeding motor 23 drives the second feeding unit 6B for feeding print media S from the second cassette 5B. A first conveying motor 24 drives a first intermediate roller 71A which conveys first a print medium S fed by the first feeding unit 6A. A second conveying motor 25 drives a second intermediate roller 71B which conveys first a print medium S fed by the second feeding unit 6B.

A main conveying motor 26 drives a main conveying roller 70 which is disposed upstream of the platen 9 and conveys mainly the print medium S being printed. The main conveying motor 26 also drives two conveying rollers 7 that are disposed downstream of the platen 9 and convey further downstream the print medium S conveyed by the main conveying roller 70.

A third conveying motor 27 drives two conveying rollers 7 that convey downward the print medium S on the first side of which printing has been performed. The third conveying motor 27 also drives two conveying rollers 7 that are disposed along the inner guide 19 and convey toward the print head 8 the print medium fed from the second cassette 5B and conveyed by the second intermediate roller 71B or the print medium on the first side of which printing has been performed and which was reversed.

A fourth conveying motor 28 drives two conveying rollers 7 that convey upward or downward the print medium S on which print operation has been performed. A discharging motor 29 drives the discharging roller 12 which discharges the print medium S on which printing has been performed to the discharging tray 13. In this way, each of the two feeding motors 22 and 23, five conveying motors 24 to 28, and discharging motor 29 is associated with one or more drive rollers.

Meanwhile, at eight places along the conveying path are disposed the detection members 20 for detecting the presence of the print medium S. Each detection member 20 includes a sensor and a mirror disposed on both sides of the conveying path. The sensor having a light emitting portion and a light receiving portion is disposed on one side of the conveying path; the mirror is disposed at a position on the other side of the conveying path and facing the sensor. The light emitted from the light emitting portion of the sensor is reflected by the mirror, and the presence of a print medium S, in other words, whether the leading edge or the trailing edge has passed is determined based on whether the light receiving portion detects the reflected light.

The conveyance control unit 207 drives the feeding motors 22 and 23, the conveying motors 24 to 28, and the discharging motor 29 separately to control the conveyance as the entire apparatus, based on the detection results from the multiple detection members 20 and the output values of the encoders each of which detects the amount of rotation of the corresponding drive roller.

Figure 9A:
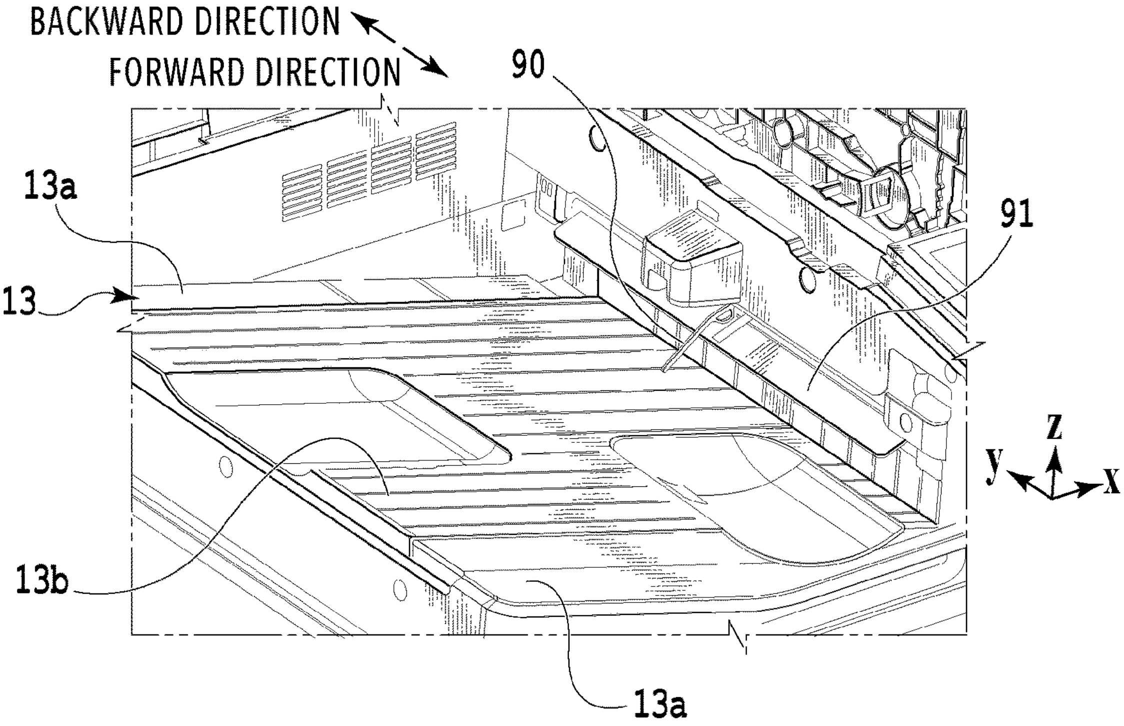
FIGS. 9A and 9B are diagrams illustrating a schematic configuration of a discharging tray and a movement mechanism of a movable tray.
Figure 9B:
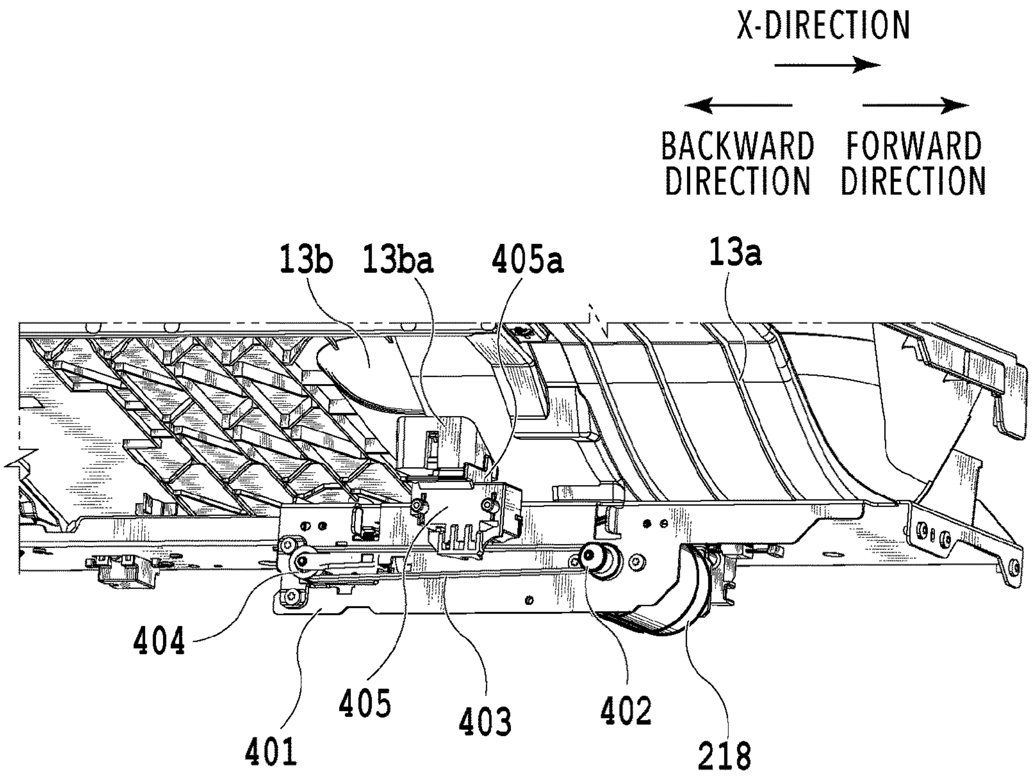

Next, the configuration of the discharging tray 13 will be described. FIG. 9A is a schematic configuration perspective diagram of the discharging tray 13 in the printing apparatus 1. FIG. 9B is a schematic configuration diagram illustrating the movement mechanism of the movable tray 13*b* of the discharging tray 13.

The discharging tray 13 (stacking unit) has a slanted surface which is slanted relative to the print medium S being discharged, and the print media S are stacked on this slanted surface. The discharging tray 13 includes fixed trays 13*a* fixed to frames which are frameworks of the printing apparatus 1 and the movable tray 13*b* movable in the y-direction (the direction orthogonal to the direction in which the print medium S is discharged) on the fixed tray 13*a*, as illustrated in FIG. 9A. The fixed trays 13*a* are located at both edges of the discharging tray 13 in the y-direction, and the movable tray 13*b* is located at the center portion in the y-direction. With this structure, the print media S discharged onto the discharging tray 13 are mainly stacked on the movable tray 13*b*. For example, based on an instruction inputted by the user, when a specified number of print media S are discharged, the movable tray 13*b* moves in the forward direction or backward direction of the y-direction on the discharging tray 13 so that print media S are sorted into stacks each being the specified number of print media.

The movable tray 13*b* (movable portion) is movable via a movement mechanism relative to the fixed tray 13*a* in the forward direction and backward direction of the y-direction as illustrated in FIG. 9B. The fixed tray 13*a* has a base member 401 extending in the y-direction, on the back surface thereof (the surface opposed to the surface on which the print media S are stacked). On the base member 401 is disposed the drive unit 218 including a motor driven under the control of the sorting control unit 217. Also, on the base member 401 are disposed a pulley 402 that rotates by being driven by the drive unit 218 and an idler pulley 404 between which and the pulley 402 an endless belt 403 is stretched. The belt 403 stretched between the pulley 402 and the idler pulley 404 extends in the y-direction. Fixed to the belt 403 is a driving force transmission unit 405. The driving force transmission unit 405 is provided with a connecting portion 405*a* that is connected to a connecting portion 13*ba* disposed on the back surface of the movable tray 13*b*.

With this structure, the rotation of the belt 403 by the drive unit 218 moves the driving force transmission unit 405 in the forward direction and backward direction of the y-direction. This movement of the driving force transmission unit 405 moves in the y-direction the movable tray 13*b* connected to the driving force transmission unit 405 via the connecting portions 405*a* and 13*ba*. In other words, the driving force of the drive unit 218 is transmitted to the movable tray 13*b* via the belt 403 and other parts, and the transmitted driving force moves the movable tray 13*b* in the forward direction and backward direction of the y-direction.

Figure 10A:
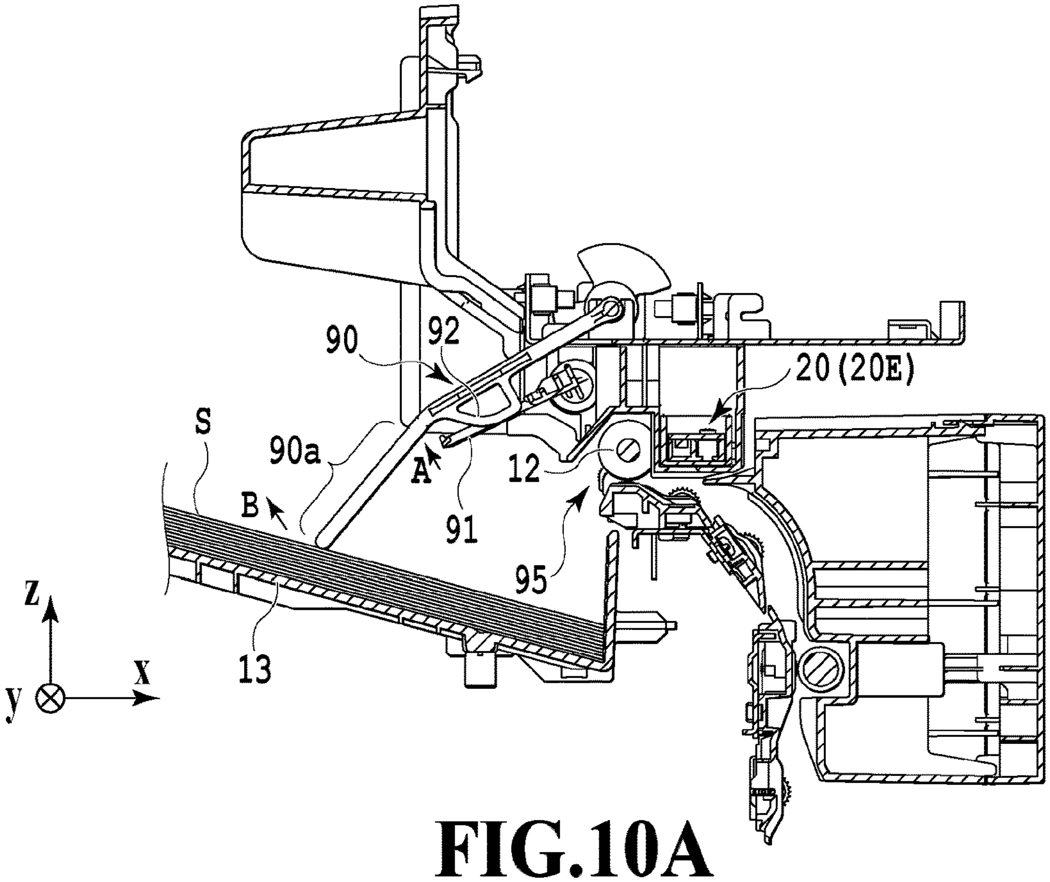
FIGS. 10A and 10B are diagrams illustrating states where an arm is at a detecting position and at an evacuation position.
Figure 10B:
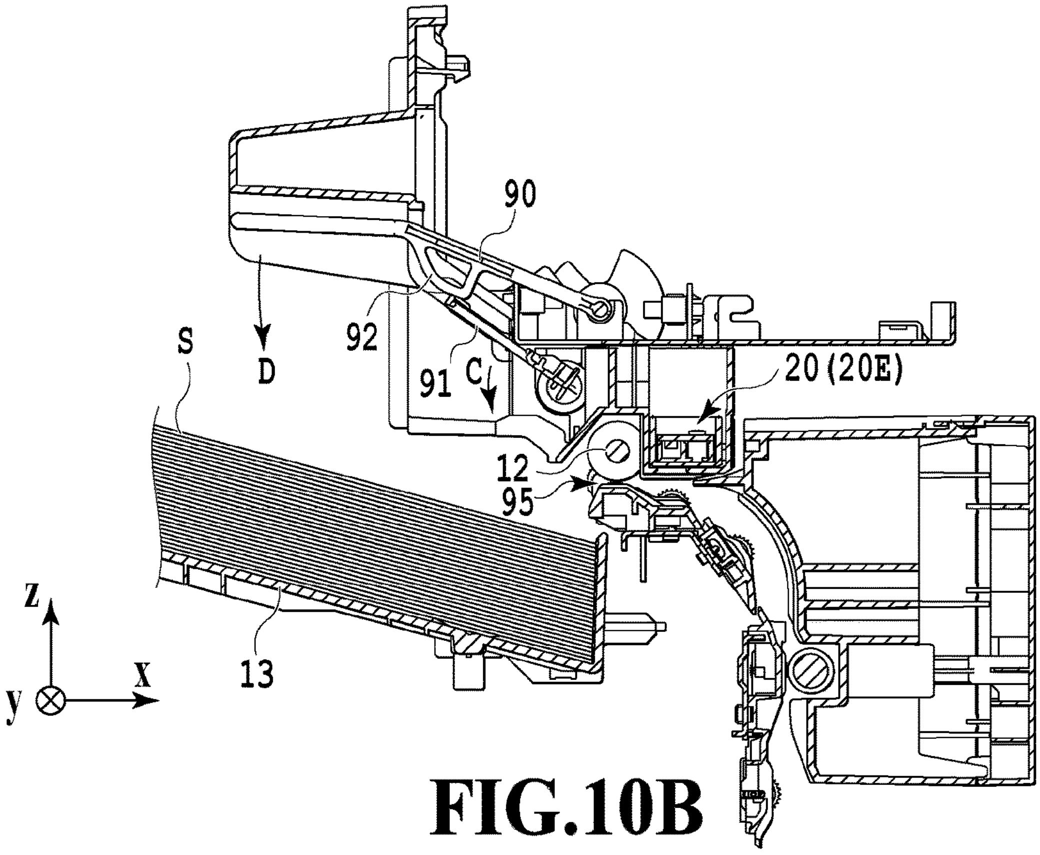
Figure 11:
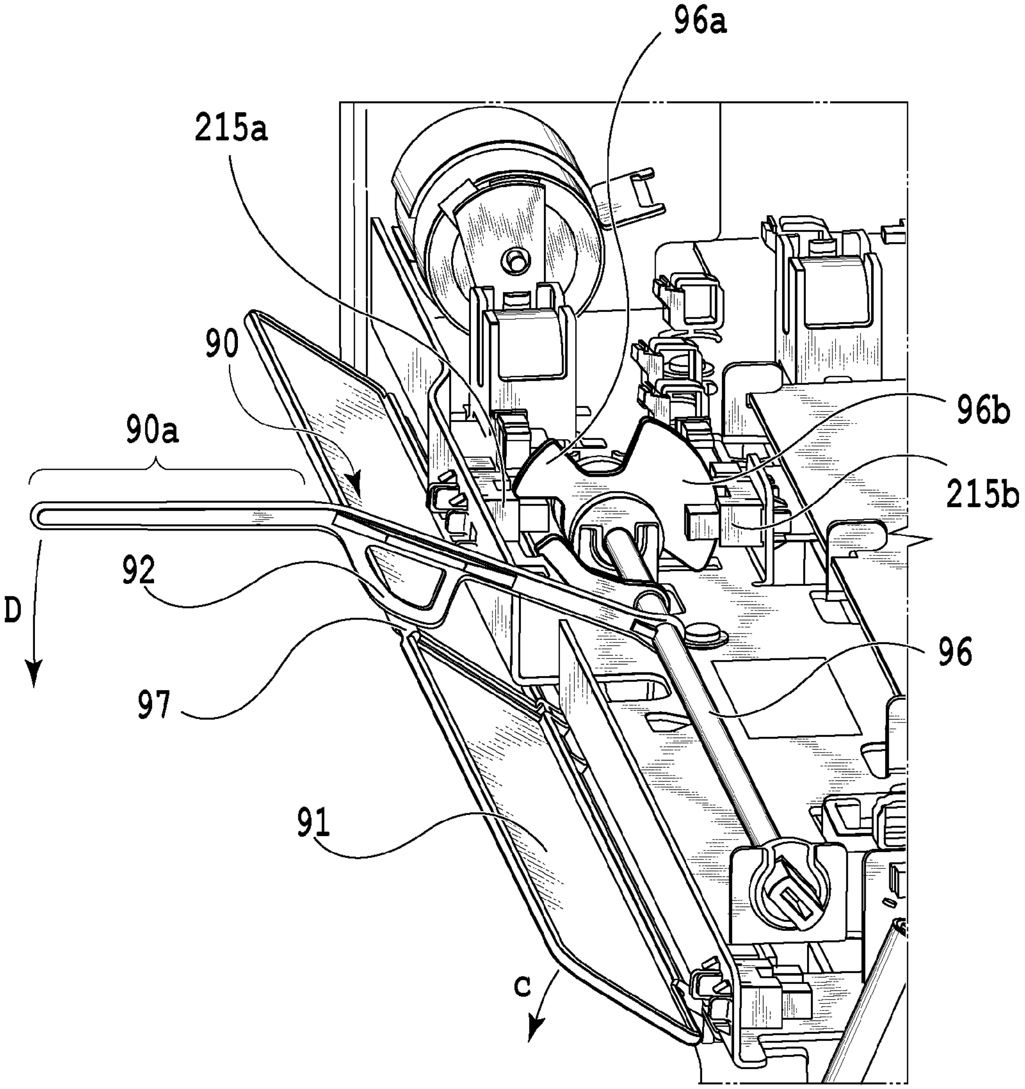
FIG. 11 is a diagram illustrating the structure near the arm.

Next, description will be provided for the structure for detecting a stack amount of print media S on the discharging tray 13. FIG. 10A is a cross-sectional view of a discharge opening 95 and its periphery in a case where the arm 90 is at the detecting position where the arm 90 can detect the stack amount of print media S. FIG. 10B is a cross-sectional view of the discharge opening 95 and its periphery in a case where the arm 90 is at the evacuation position where the arm 90 is not in contact with the print medium S. FIG. 11 is a schematic configuration perspective diagram illustrating the arm 90 and its periphery.

The printing apparatus 1 includes the arm 90 to detect the stack amount of print media S on the discharging tray 13 and the flapper 91 that rotates the arm 90 and is also capable of restraining curling of the discharged print medium S, near the discharge opening 95 through which the print medium S is discharged by the discharging roller 12. The arm 90 is rotatable, and its rotation center is above the discharge opening 95. The flapper 91 is rotatable, and its rotation center is between the rotation center of the arm 90 and the discharge opening 95 in the z-direction.

The rotation of the flapper 91 is controlled by a drive unit (not illustrated) driven by the arm control unit 213. The arm 90 and the flapper 91 are separate members, so that the arm 90 and the flapper 91 can operate separately. Note that the arm 90 can come into contact with and move away from the flapper 91 via a cam portion 92 provided on the arm 90. With this structure, the arm 90 rotates by being driven by the flapper 91 and is movable between the detecting position where the distal end of the arm 90 can come into contact with the print media S stacked on the discharging tray 13 by its rotating and the evacuation position where the arm 90 does not come into contact with the print medium S being discharged from the discharge opening 95.

The evacuation position should preferably be, for example, a position where the arm 90 does not come into contact with the print medium S being discharged from the discharge opening 95 and the print media S stacked on the discharging tray 13. In addition, the evacuation position should preferably be a position where the arm 90 is less likely to interfere with the print media S or the user's hand in a case where the user removes the stacked print media S from the discharging tray 13. The arm 90 is positioned at the detecting position in a case where it detects the stack amount of print media S on the discharging tray 13 (see FIG. 10A). The arm 90 is positioned at the evacuation position at maintenance, removal of the print medium S, a specified timing in a full-stack detection process described later, and the like (see FIG. 10B).

The flapper 91 has a guide groove 97 formed at an approximate center thereof, and the cam portion 92 provided on the arm 90 is slidably in contact with this guide groove 97. Here, the arm 90 is rotatable around a supporting shaft 96 extending in the y-direction. The supporting shaft 96 rotates circumferentially according to the displacement of the arm 90. Thus, in a case where the flapper 91 rotates in the arrow A direction (see FIG. 10A), the arm 90 is moved up from the detecting position by means of the cam portion 92 and rotates in the arrow B direction (see FIG. 10A) to the evacuation position. In a case where the flapper 91 rotates in the arrow C direction (see FIG. 10B), the arm 90 moves from the evacuation position following the rotation of the flapper 91 by its own weight and rotates in the arrow D direction (see FIG. 10B) to the detecting position.

The supporting shaft 96 has a first flag **96*a* and a second flag 96*b* fixed thereto at different positions in the circumferential direction (rotation direction) of the supporting shaft 96. In other words, the first flag 96*a* and the second flag 96*b* have the same rotation center as the arm 90, so that the rotation of the arm 90 causes the first flag 96*a* and the second flag 96*b* to rotate integrally with the arm 90. In addition, sensors 215 (a first sensor 215*a* and a second sensor 215*b*) are provided to detect the rotation of the first flag 96*a* and the second flag 96*b*. The first sensor 215*a* detects the first flag 96*a*, and the second sensor 215*b* detects the second flag 96*b*. The sensors 215 are, for example, photo interrupters, and the on and off of the first sensor 215*a* or the second sensor 215*b* is determined based on whether the first flag 96*a* or the second flag 96*b* blocks light. This allows the sensors 215 to detect the rotation state of the arm 90. Thus, based on the detection results by the sensors 215, it is possible to estimate the stack amount of print media S on the discharging tray 13**.

In the present embodiment, the first flag **96*a* and second flag 96*b* and the first sensor 215*a* and second sensor 215*b* are included in the stack-amount detection unit 214. The detection results by the first sensor 215*a* and the second sensor 215*b*, for example, are outputted from the stack-amount detection unit 214 to the print controller 202, which estimates the stack amount. In other words, in the present embodiment, the arm 90, the stack-amount detection unit 214, and the print controller 202 function as a detection unit configured to detect the stack amount of print media S on the discharging tray 13**.

Specifically, the stack amount is determined by combinations of detection results of the first sensor **215*a* and the second sensor 215*b*. FIG. 12A is a table showing the relationship between the detection results of the first sensor 215*a* and the second sensor 215*b* and the stack amount. In the first sensor 215*a* and the second sensor 215*b*, "ON" indicates that the light is blocked, and "OFF" indicates that the light is passing through. The stack amount is defined by the vertical length from the surface of the discharging tray 13 on which print media S are stacked. FIG. 12B is a diagram illustrating the state where the stack amount is less than 14 mm. In this state, both the first sensor 215*a* and the second sensor 215*b*, light toward which is not blocked, are "OFF". FIG. 12C is a diagram illustrating the state where the stack amount is more than or equal to 14 mm and less than 33 mm (what is called "nearly full stack"). In this state, the first sensor 215*a*, light toward which is blocked by the first flag 96*a*, is "ON", and the second sensor 215*b*, light toward which is not blocked by the second flag 96*b*, is "OFF". FIG. 12D is a diagram illustrating the state where the stack amount is more than or equal to 33 mm (what is called "full stack"). In this state, both the first sensor 215*a* and the second sensor 215*b*, light toward which is blocked, are "ON". FIG. 12E is a diagram illustrating the state where the arm 90 is at the evacuation position. In this state, the first sensor 215*a*, light toward which is not blocked by the first flag 96*a*, is "OFF", and the second sensor 215*b*, light toward which is blocked by the second flag 96*b***, is "ON".

Figure 13A:
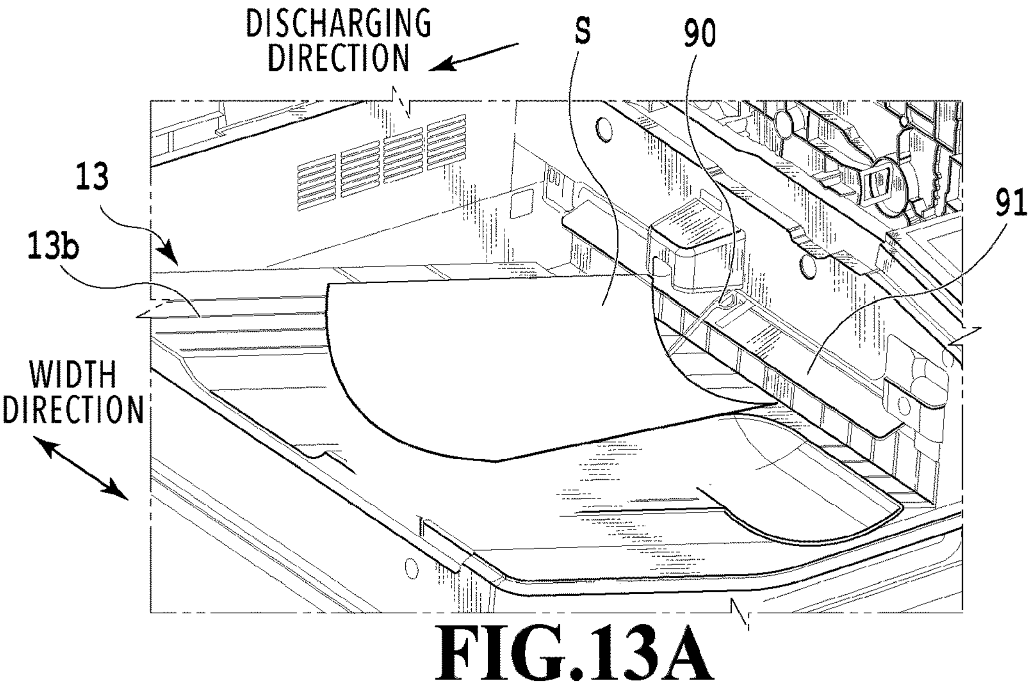
FIGS. 13A, 13B, and 13C are diagrams for explaining the occurrence of curling and the problem in the curling.
Figure 13B:
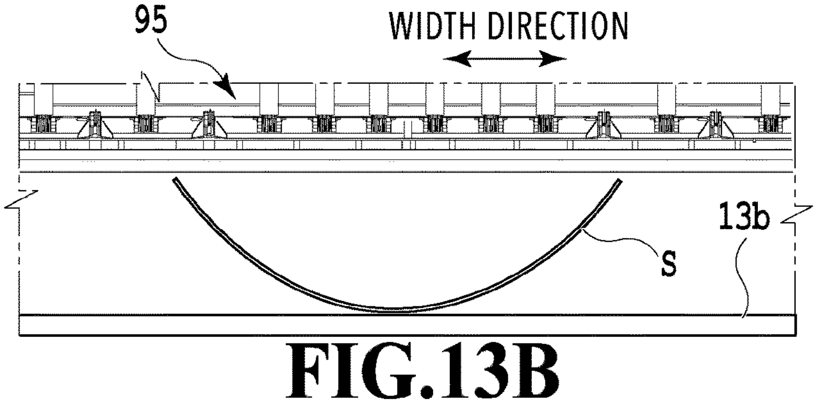
Figure 13C:
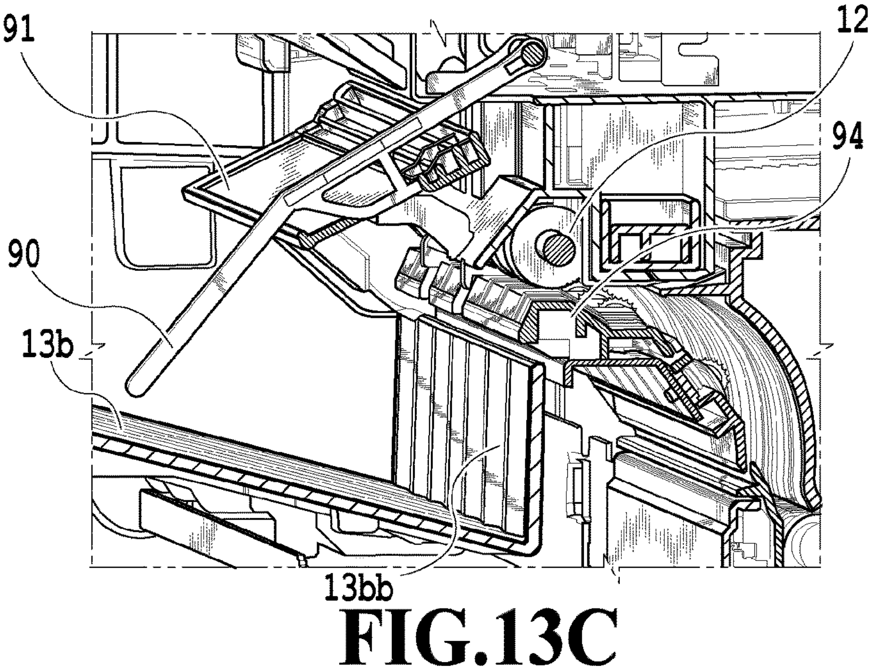

Here, curling of a print medium S caused by printing will be described. In a case where the print medium is print paper, curling caused by ink ejected from the print head 8 is different depending on the paper grain direction of the print paper. FIG. 13A is a diagram illustrating the state of curling in a case where a print paper sheet (long grain paper) the entire print surface of which ink has been applied to uniformly by the printing apparatus 1 is discharged on the discharging tray 13 without its curling being suppressed. FIG. 13B is a diagram illustrating the print medium S discharged on the discharging tray 13 in FIG. 13A when viewed from the downstream side toward the upstream side in the discharging direction. FIG. 13C is a cross-sectional perspective view of the discharge opening 95 and its periphery. Note that in the printing apparatus 1, the print medium S is discharged with the printed surface facing down, which operation is called the face-down discharging.

In a case of long grain paper, the paper grain direction of which agree with the longitudinal direction (discharging direction), application of ink causes curling at both edges in the width direction (y-direction) which intersects (is orthogonal to) the discharging direction of the print medium S, causing both the edge portions to curl up from the discharging tray 13 (movable tray 13*b*), as illustrated in FIG. 13A. Note that although not illustrated, in a case of short grain paper the paper grain direction of which is the lateral direction (width direction), curling occurs at both edges of the print medium S in the discharging direction, and both the edge portions curl up from the discharging tray 13 (movable tray 13*b*).

Thus, in a case where the sheet is long grain paper, and curling occurs as illustrated in FIG. 13B, the contact area between the print medium S and the movable tray 13*b* is smaller in the width direction than in the case of no curling. In other words, this print medium S is unstable on the movable tray 13*b* with respect to force in the width direction. In a case where the movable tray 13*b* moves in the width direction (y-direction) in this state, the print medium S on the movable tray 13*b* moves in the width direction. As a result, there is a possibility that the print media S discharged cannot be sorted by means of the movable tray 13*b* properly.

In addition, in a case where the edge portions of the print medium S in the width direction are curled, the edge portions in the width direction may come into contact with a member fixedly disposed around the discharge opening 95, for example, a spur base 94 (see FIG. 13C), on the discharging tray 13. In a case where the movable tray 13*b* moves in a state where the edge portions curled up by curling is in contact with a member disposed fixedly, the print medium S turns about the position of the print medium S that is in contact with the member. This decreases an orderly stacking property of the discharged print medium S and prevents the print medium S from being sorted properly. Note that the spur base 94 protrudes downstream in the discharging direction above a standing surface 13*bb* of the movable tray 13*b*, and the protruded portion is located downstream of the standing surface 13*bb*.

In the present embodiment, in printing operation for performing printing on the print media S, a curling suppressing operation (suppressing operation) is determined according to whether sorting operation is to be executed, along with various conditions. Specifically, a curling suppressing operation (including the necessity of curling suppressing operation) is determined according to a monitor value calculated based on four conditions. The four conditions are the ink injection amount, the type of print medium S, the temperature and humidity environment, and the stack amount and sorting information. A correction value is obtained for each condition, and the obtained correction values are added up to obtain the monitor value. The obtained monitor value is compared with thresholds corresponding to respective curling suppressing operations, a curling suppressing operation is determined based on the comparison result.

Hereinafter, description will be provided for how to obtain the correction values based on the conditions and how to obtain the monitor value. Note that in the present embodiment, description is provided for a case where the print medium S is print paper (long grain paper). Obtaining the correction values and obtaining the monitor value based on the correction values are executed by the print controller 202. In other words, in the present embodiment, the print controller 202 functions as an obtaining unit configured to obtain the correction values and the monitor value.

<Obtaining Correction Values Based on Ink Injection Amount>

Figures 14A, 14B:
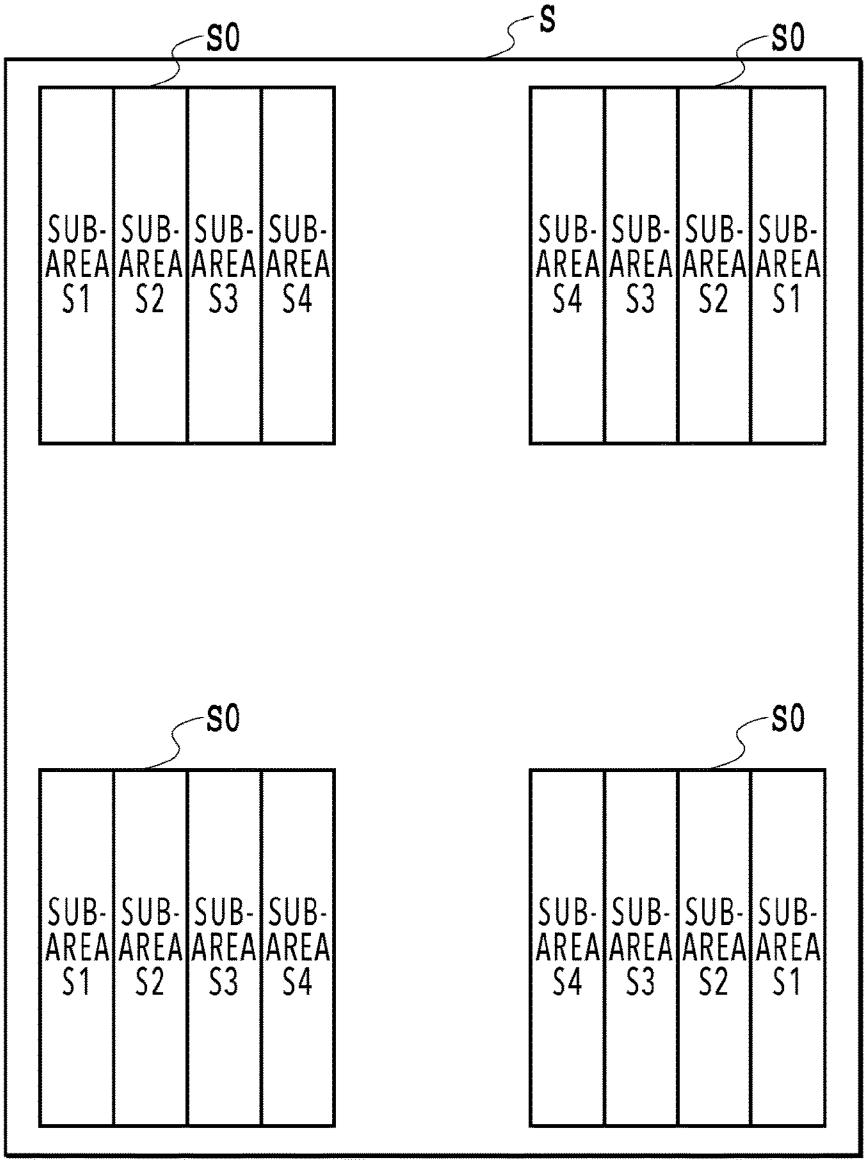
FIGS. 14A and 14B are diagrams for explaining correction values based on the ink injection amount.

FIG. 14A is a diagram illustrating specified areas S0 for calculating the ink injection amount; FIG. 14B is a table showing weighting coefficients set for respective areas in the specified area S0.

For the print medium S such as print paper, even if the amount of applied ink is the same, the degree of curling (the amount of curling, in other words, the amount of curling up from the movable tray 13*b* in the present embodiment) is different depending on the printing position of the ink. Specifically, the closer to an edge of the print medium S the area of printing is, the more noticeable curling occurs. Thus, in the present invention, the ink injection amount (the amount of applied ink, the ratio of ink) in the specified area S0 at each of the four corners of the print medium S is calculated, and a correction value is obtained based on the calculation result for the specified area S0 having the largest ink injection amount among the four specified areas S0. Note that calculation of the ink injection amounts at the four specified areas S0 is executed by the print controller 202. In other words, in the present embodiment, the print controller 202 functions as a calculation unit configured to calculate the ink injection amount.

The size (area) of the specified area S0 may be changed according to various conditions such as the type of print medium S that can be used and the type of ink to be used. For the position of the specified area S0, the specified area S0 may be away by a specified distance from the nearest short side or long side of the print medium S, or the specified area S0 may abut on it. The distance from the short side and the distance from the long side may be different.

Each of the four specified areas S0 is divided into four sub-areas in the width direction of the print medium S (the moving direction of the movable tray 13*b*). Specifically, the sub-area S1, sub-area S2, sub-area S3, and sub-area S4 are set in this order from the edge toward the center of the print medium S in the width direction. The ink injection amount in each specified area S0 is calculated as a sum of products of the ink injection amounts in the respective sub-areas S1, S2, S3, and S4 multiplied by the corresponding weighting coefficients.

Specifically, to calculate the ink injection amount of the specified area S0, the ink injection amount in each of the sub-areas S1, S2, S3, and S4 is calculated based on input image data. For each of the sub-areas S1, S2, S3, and S4, the corresponding weighting coefficient is set in advance (see FIG. 14B). The ink injection amount calculated for an area is multiplied by the weighting coefficient set for the area. Specifically, the ink injection amount in the sub-area S1 is multiplied by the weighting coefficient "4". The ink injection amount in the sub-area S2 is multiplied by the weighting coefficient "3". The ink injection amount in the sub-area S3 is multiplied by the weighting coefficient "2". The ink injection amount in the sub-area S4 is multiplied by the weighting coefficient "1". Note that the closer to the edge in the width direction an area is, the larger the weighting coefficient of the area is. After that, the calculated values are added up, and the resultant value is the ink injection amount of the specified area S0.

The ink injection amount is calculated for each of the four specified areas S0 as described above, and a correction value is obtained based on the ink injection amount of the specified area S0 for which the calculated value is largest. For the correction value, for example, a table in which correction values based on the ink injection amount are set in advance is stored in the ROM 203 or the like, and a correction value is obtained based on the table. Alternatively, a formula having the ink injection amount as a variable may be stored in the ROM 203 or the like, and the correction value may be obtained based on the formula.

<Obtaining Correction Value Based on Type of Print Media S, and Obtaining Correction Value Based on Temperature and Humidity Environment>

FIG. 15A is a table showing correction values set according to the type of print medium S; FIG. 15B is a table showing correction values set according to combinations of temperatures and humidities.

The table in which correction values are set according to the type of print medium S (see FIG. 15A) is stored, for example, in the ROM 203 or the like. A correction value based on the type of print medium S is obtained from the stored table using inputted information on the type of print medium S.

Also, the table in which correction values are set according to combinations of temperatures and humidities (see FIG. 15B) is stored, for example, in the ROM 203 or the like. A correction value based on the temperature and humidity environment is obtained from the stored table based on the detection result detected by the temperature detection unit 219 and the detection result detected by the humidity detection unit 220.

Note that for the correction values set in the tables of FIGS. 15A and 15B, the larger curling is caused by ink application in a condition, the larger value is set for the condition. The correction values are not limited to the values indicated in FIGS. 15A and 15B. Specifically, the correction value may be changed depending on the type of ink to be used. In addition, although the correction value based on temperature and humidity environment is obtained using a table as shown in FIG. 15B, the present invention is not limited to this method. Specifically, a formula having information on temperature and humidity as variables may be stored in the ROM 203 or the like, the correction value may be calculated based on the formula.

<Obtaining Correction Value Based on Stack Amount and Sorting Information>

FIG. 16A is a diagram illustrating the discharge opening 95 and its periphery in a case where the stack amount of print media S on the discharging tray 13 is less than a specified amount; FIG. 16B is a diagram illustrating the discharge opening 95 and its periphery in a case where the stack amount is more than or equal to the specified amount. FIG. 16C is a table showing correction values set according to the combinations of the stack amount and whether to execute the sorting operation.

In a case where the sorting information indicates that the sorting operation is not to be executed, the possibility that the movement of the movable tray 13*b* in the width direction may cause a curled print medium S to be caught at the spur base 94, does not have to be taken into account, but only an opening for discharging, specifically, the discharge path from the discharge opening 95 needs to be provided for the print medium. In other words, the operation only needs to be such that the print medium S being discharged does not hit the trailing edge (the upstream edge portion in the discharging direction) of a curled portion of stacked print media S. Thus, in the vertical direction (z-direction), the curled print medium S is made to be within the distance L1 from the trailing edge (the upstream edge portion in the discharging direction) of the stacked print media to the discharge opening 95. In other words, in a case where a curled print medium S is stacked onto the print media S on the discharging tray 13, the trailing edge of the curled print medium S is made to be positioned below the discharge opening 95.

On the other hand, in a case where the sorting information indicates that the sorting operation is to be executed, the possibility of the print media S being caught at the spur base 94 needs to be taken into account in order to sort stacked print media S properly. Thus, in the vertical direction (z-direction), the curled print medium S is made to be within the distance L2 from the trailing edge of the stacked print media S to the spur base 94. In other words, in a case where a curled print medium S is stacked onto the print media S on the discharging tray 13, the trailing edge of the curled print medium S is made to be positioned below the spur base 94.

Distance L2 is shorter than distance L1. Accordingly, the amount of allowable curling is smaller in a case of executing the sorting operation than in a case of no sorting operation, and thus the amount of curling that the curling suppressing operation has to suppress is higher. Hence, the correction value is set larger in a case of executing the sorting operation than in a case of no sorting operation.

Meanwhile, the distances L1 and L2 from the print media S stacked on the discharging tray 13 to the discharge opening 95 and the spur base 94, respectively, are shorter in a case where the stack amount of print media S on the discharging tray 13 is more than or equal to a specified amount (see FIG. 16B) than in a case where it is less than the specified amount (see FIG. 16A). Thus, the amount of allowable curling is lower in a case where the stack amount of print media S on the discharging tray 13 is more than or equal to the specified amount than in a case where it is less than the specified amount, thus the amount of curling that the curling suppressing operation has to suppress is higher. Hence, the correction value is larger in a case where the stack amount of print media S on the discharging tray 13 is more than or equal to the specified amount than in a case where it is less than the specified amount. Note that in the present embodiment, the specified amount for the stack amount is set to 14 mm. The specified amount for the stack amount is not limited to 14 mm, but it may be changed depending on the apparatus configuration and other factors.

Based on these viewpoints, a table in which correction values are set according to the combinations of the stack amount and whether to execute the sorting operation (see FIG. 16C), is created and stored in the ROM 203. A correction value based on the stack amount and whether to execute the sorting operation is obtained from the stored table based on the information on the stack amount obtained by the stack-amount detection unit 214 and the setting information on whether to execute the sorting operation.

Note that for the correction values set in the table of FIG. 16C, the correction value is larger in a case where the stack amount is more than or equal to the specified amount than in a case where it is less than the specified amount. The correction value is also larger in a case of executing the sorting operation than in a case of no sorting operation. Although correction values in two steps are set—in a case where the stack amount is more than or equal to the specified amount as the threshold and in a case where it is less than the specified amount—the present invention is not limited to this setting. The correction values in three or more steps may be set for the stack amount. In this case, increasing the number of sensors and flags as appropriate enables the stack-amount detection unit 214 to detect the stack amount in three or more steps.

<Obtaining Monitor Value>

The correction value based on the ink injection amount, the correction value based on the type of print medium S, the correction value based on the temperature and humidity environment, and the correction value based on the stack amount and the sorting information are added up to obtain the monitor value. For example, in a case where the ink injection amount in the specified area S0 is 260, the type of print medium S is plain paper, the temperature is 30° C., the humidity is 60%, the stack amount is 5 mm, and the sorting operation is to be executed, the correction values are as follows. The correction value based on the ink injection amount is “260”, the correction value based on the type of print medium S is “30”, the correction value based on the temperature and humidity environment is “−80”, and the correction value based on the stack amount and the sorting information is “20”. Thus, the monitor value is 260+30+(−80)+20=230. By comparing the monitor value thus obtained with thresholds described later, a curling suppressing operation is selected and executed.

Selection of a curling suppressing operation based on the monitor value is made based on the thresholds set for the curling suppressing operations. In the present embodiment, the printing apparatus 1 is capable of executing a first curling suppressing operation and a second curling suppressing operation in printing operation for performing printing on the print media S. In the first curling suppressing operation, the conveyance speed is reduced to retain the print medium S after printing within the conveying path for a first period. In the second curling suppressing operation, to retain the print medium after printing within the conveying path for a second period which is longer the first period, the conveyance speed is reduced, and in addition, the print medium is stopped for a certain period within the conveying path after printing. Specifically, the retention period of the print medium within the conveying path is set longer in the second curling suppressing operation than in the first curling suppressing operation, increasing the ink drying time, and this makes it possible to discharge the print medium in a state where curls of the print medium are sufficiently suppressed.

For the first curling suppressing operation and the second curling suppressing operation, different thresholds are set. For example, for the first curling suppressing operation, a first threshold “220” is set, and for the second curling suppressing operation a second threshold “250” is set, which is larger than the first threshold. In a case where the obtained monitor value is less than 220, no curling suppressing operation is executed; 220 or more and less than 250, the first curling suppressing operation is executed; and 250 or more, the second curling suppressing operation is executed. Note that the determination of the curling suppressing operation to be executed is executed by the print controller 202. In other words, in the present embodiment, the print controller 202 is capable of determining whether to execute a curling suppressing operation by comparing the monitor value and the thresholds, and also functions as a determining unit capable of determining the curling suppressing operation to be executed.

Figure 17:
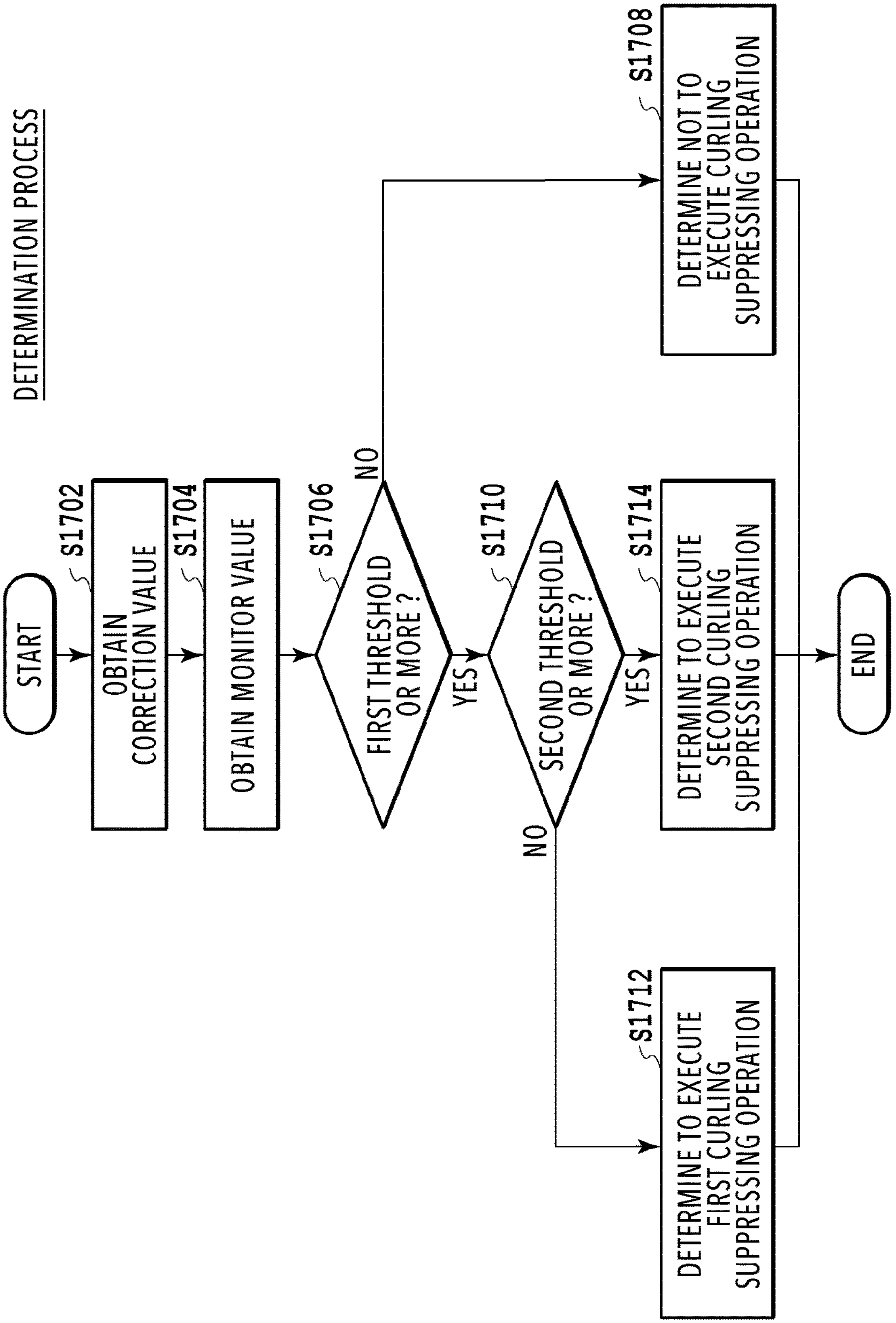
FIG. 17 is a flowchart illustrating a detailed process routine of a determination process.

With the above configuration, in a case where the user gives an instruction to start printing with an input of information necessary for performing printing on the print media S, a determination process for determining a curling suppressing operation is executed, and after that, printing operation is executed based on the determined curling suppressing operation. FIG. 17 is a flowchart illustrating the process details of the determination process. A series of processes illustrated in the flowchart of FIG. 17 is executed by the print controller 202 loading program codes stored in the ROM 203 to the RAM 204. Alternatively, part or all of the functions in the steps in FIG. 17 may be implemented by using hardware, such as an ASIC or an electronic circuit.

When the determination process starts, first the print controller 202 obtains the correction values (S1702). Specifically, at S1702, the print controller 202 obtains the correction value based on the ink injection amount, the correction value based on the type of print medium S, the correction value based on the temperature and humidity environment, and the correction value based on the stack amount and the sorting information.

Next, the monitor value is obtained based on the obtained correction values (S1704), and it is determined whether the obtained monitor value is larger than or equal to the first threshold (S1706). In a case where it is determined at S1706 that the monitor value is not larger than or equal to the first threshold, it is determined that the curling suppressing operation is not to be executed (S1708), and this determination process ends. In a case where it is determined at S1706 that the monitor value is larger than or equal to the first threshold, it is determined whether the monitor value is larger than or equal to the second threshold (S1710).

In a case where it is determined at S1710 that the monitor value is not larger than or equal to the second threshold, it is determined that the first curling suppressing operation is to be executed (S1712), and this determining process ends. In other words, it is determined at S1712 that the first curling suppressing operation, in which the conveyance speed of the print medium S is reduced, is to be executed in printing operation. In a case where it is determined at S1710 that the monitor value is larger than or equal to the second threshold, it is determined that the second curling suppressing operation is to be executed (S1714), and this determining process ends. In other words, it is determined at S1714 that the second curling suppressing operation, in which the conveyance speed of the print medium S is reduced and the print medium S after printing is stopped for a certain period, is to be executed in printing operation.

After that, printing operation is performed on the print media S based on the curling control process determined by the determining unit and various kinds of information included in the print job. Specifically, in printing operation with the first curling suppressing operation, print operation is executed on the print media S with the conveyance speed of the print medium S reduced from the speed set in advance to the speed set for the first curling suppressing operation. In printing operation with the second curling suppressing operation, print operation is executed on the print media S with the conveyance speed of the print medium S reduced from the speed set in advance to the speed set for the second curling suppressing operation. In addition, the print medium S after printing is stopped within the conveying path for a certain period, and then discharged onto the discharging tray 13.

Note that the print operation with the curling suppressing operation is executed by the print controller 202 controlling the conveyance control unit 207 and the print head 8. In other words, in the present embodiment, the print controller 202 functions as a print control unit configured to perform printing on the print media S while executing the curling suppressing operation.

As has been described above, the printing apparatus 1 includes the discharging tray 13 configured such that the movable tray 13*b* is movable on the fixed tray 13*a* in a direction orthogonal to the discharging direction of the print medium S being discharged (in the width direction of the print medium S). In addition, before executing printing operation, not only the correction values based on the ink injection amount, the type of print medium S, and the temperature and humidity environment, but also the correction value based on the stack amount and whether to execute the sorting operation is obtained, and a curling control process is determined according to the monitor value based on the obtained correction values. Note that the monitor value is set larger in a case of performing the sorting operation than in a case of no sorting operation, and thus the larger the monitor value is, the more likely the curling suppressing operation having a higher effect to suppress curling is executed.

This configuration allows the printing apparatus 1 to execute the operation that suppresses curling of the print medium S after printing more positively in a case of executing the sorting operation than in a case of no sorting operation. With this operation, the printing apparatus 1 can suppress curling of the print medium S so that the print media S discharged can be properly sorted.

OTHER EMBODIMENTS

Note that the above embodiment may be modified as described in the following (1) to (6).

(1) Although in the above embodiment, in a case where the print medium S is long grain paper, the print medium S discharged is sorted by shift in the width direction, the present invention is not limited to this operation. Specifically, in a case where the print medium S is short grain paper, the print medium S discharged may be sorted by shift in the conveyance direction. In this case, the specified area S0 is divided into four sub-areas in the discharging direction. In the four sub-areas, the weighting coefficients are set such that the values decrease from the edge to the center in the discharging direction. Although in the above embodiment, the specified area S0 for calculating the ink injection amount is divided into four sub-areas, the present invention is not limited to this number. Specifically, the specified area S0 may be divided into two or three sub-areas, or it may be divided into five or more sub-areas.

(2) Although in the above embodiment, the printing apparatus 1 is capable of executing the first curling suppressing operation, in which the conveyance speed is reduced, and the second curling suppressing operation, in which the conveyance speed is reduced and the print medium S after printing is stopped for a certain period, the present invention is not limited to this operation. Specifically, the printing apparatus 1 may be capable of only one of the curling suppressing operations. Although in the above embodiment, as the curling suppressing operation, the retention period of the print medium S is changed to dry the print medium S after printing within the conveying path and thus to suppress curling of the print medium S, the present invention is not limited to this operation. Specifically, the printing apparatus 1 may have a mechanism for correcting curls, and in the curling suppressing operation, curling may be suppressed by means of the mechanism.

(3) Although in the present embodiment, one curling suppressing operation is selected out of the two curling suppressing operations, the present invention is not limited to this operation. Specifically, one curling suppressing operation may be selected out of three or more curling suppressing operations. In this case, for example, three or more kinds of curling suppressing operations would be set, each having a different retention period for which the print medium S is retained within the conveying path. The number of curling suppressing operations may be one, and only whether the curling suppressing operation is to be executed may be determined according to the monitor value. Further, preparing two curling suppressing operations, only one of the curling suppressing operations may be determined according to the monitor value.

(4) Although not described in the above embodiment, even in a case of no sorting operation, for example, the stacked print media S may be moved by means of the movable tray 13*b* to a position where the user can take them out easily, for the user taking out print media S. Although in the above embodiment, the arm 90 is displaced by rotation, the present invention is not limited to this configuration. Specifically, the arm 90 may be displaced by any kind of movement as long as the arm 90 does not obstruct the movement of the print medium S being discharged, and the arm 90 is capable of detecting the stack amount at the position where the arm 90 is displaced.

(5) Although in the above embodiment, the printing apparatus 1 is an inkjet printing apparatus of a full line type, the present invention is not limited to this type. Specifically, the printing apparatus 1 may be an inkjet printing apparatus of a serial type. In addition, although the printing apparatus 1 performs printing by an inkjet method, the present invention is not limited to this method. Various known techniques can be used for the printing method.

(6) Although in the above embodiment, a curling suppressing operation is determined based on the monitor value obtained from the correction values based on the ink injection amount, the type of print medium, the temperature and humidity environment, and the stack amount and sorting information, the present invention is not limited to this operation. Specifically, the monitor value may be obtained based on at least whether to execute the sorting operation. In other words, the monitor value may be obtained only from the information on whether to execute the sorting operation, or the monitor value may be obtained based on the sorting information and at least one of the conditions of the ink injection amount, the type of print medium, the temperature, the humidity, and the stack amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-104789 filed May 31, 2018, which is hereby incorporated by reference herein in its entirety.

What is claimed is:

1. A printing apparatus comprising:

a print head configured to apply liquid to a print medium to perform printing; and a conveying unit configured to convey a print medium to a stacking unit, wherein the conveying unit conveys the print medium in a conveying path at a first conveyance speed in a case where a sorting operation is not executed, and wherein the conveying unit conveys the print medium in the conveying path at a second conveyance speed which is lower than the first conveyance speed in a case where the sorting operation is executed.

2. The printing apparatus according to claim 1, further comprising a detection unit configured to detect a stack amount of print media on the stacking unit, wherein the conveying unit conveys the print medium in such a way that a period for which the print medium to be conveyed on the stacking unit is retained within the conveying path is longer than a period for which the print medium is conveyed at the second conveyance speed in a case where (1) the sorting operation is executed and (2) the stack amount detected by the detection unit is more than or equal to a specified amount, and wherein the conveying unit conveys the print medium to be conveyed on the stacking unit in the conveying path at the second conveyance speed in a case where (1) the sorting operation is executed and (2) the stack amount detected by the detection unit is less than the specified amount.

3. The printing apparatus according to claim 1, wherein the conveying unit conveys the print medium in such a way that a period for which the print medium is retained within the conveying path before the print medium is conveyed on the stacking unit is longer than a period for which the print medium is conveyed at the second conveyance speed in a case where (1) the sorting operation is executed and (2) a liquid application amount which is an amount of liquid to be applied to a print medium by the print head is more than or equal to a specified amount, and wherein the conveying unit conveys the print medium in the conveying path at the second conveyance speed before the print medium is conveyed on the stacking unit in a case where (1) the sorting operation is executed and (2) the liquid application amount is less than the specified amount.

4. The printing apparatus according to claim 3, wherein the liquid application is a liquid application amount which is an amount of liquid to be applied by the print head in a specified area set at each of four corners of a print medium.

5. The printing apparatus according to claim 1, further comprising:

a temperature detection unit configured to detect temperature; and a humidity detection unit configured to detect humidity, wherein the conveying unit conveys the print medium in such a way that a retention period is based on a detection result by the temperature detection unit and a detection result by the humidity detection unit.

6. The printing apparatus according to claim 1, wherein the conveying unit conveys the print medium at the second conveyance speed while the print medium is conveyed on the stacking unit after printing performed by the print head ends in the conveying path in a case where the sorting operation is executed.

7. The printing apparatus according to claim 1, wherein the conveying path is a path through which the print medium in the printing apparatus is conveyed.

8. The printing apparatus according to claim 1, further comprising an input panel to which information on whether to execute the sorting operation is inputted.

9. The printing apparatus according to claim 1, further comprising a connecting unit connectable to an external apparatus that allows input of information on whether to execute the sorting operation.

10. The printing apparatus according to claim 1, wherein a movable member moves in a width direction intersecting a direction in which a print medium is discharged.

11. The printing apparatus according to claim 1, wherein a print medium is discharged onto the stacking unit with a print surface of the print medium facing down.

12. The printing apparatus according to claim 1, further comprising the stacking unit.

13. A printing apparatus comprising:

a print head configured to apply liquid to a print medium to perform printing; and a conveying unit configured to convey a print medium to a stacking unit, wherein the conveying unit do not stop the print medium at a position before the print medium is conveyed on the stacking unit after printing performed by the print head ends in a conveying path in a case where a sorting operation is not executed, and wherein the conveying unit stops, for a specified period, the print medium at the position before the print medium is conveyed on the stacking unit after printing performed by the print head ends in the conveying path in a case where the sorting operation is executed.

14. The printing apparatus according to claim 13, further comprising a detection unit configured to detect a stack amount of print media on the stacking unit, wherein the conveying unit stops, for a period longer than the specified period, the print medium at the position before the print medium is conveyed on the stacking unit after printing performed by the print head ends in the conveying path in a case where (1) the sorting operation is executed and (2) the stack amount detected by the detection unit is more than or equal to the specified amount, and wherein the conveying unit stops the print medium at the position before the print medium is conveyed on the stacking unit after printing performed by the printing head ends in the conveying path for the specified period in a case where (1) the sorting operation is executed and (2) the stack amount detected by the detection unit is less than the specified amount.

15. The printing apparatus according to claim 13, wherein the conveying unit stops, for a period longer than the specified period, the print medium at the position before the print medium is conveyed on the stacking unit after printing performed by the print head ends in the conveying path in a case where (1) the sorting operation is executed and (2) a liquid application amount which is an amount of liquid to be applied to a print medium by the print head is more than or equal to a specified amount, wherein the conveying unit stops, for the specified period, the print medium at the position before the print medium is conveyed on the stacking unit after printing performed by the print head ends in the conveying path in a case where (1) the sorting operation is executed and (2) the liquid application amount is less than the specified amount.

16. The printing apparatus according to claim 15, wherein the liquid application amount is a liquid application amount which is an amount of liquid to be applied by the print head in a specified area set at each of four corners of a print medium.

17. The printing apparatus according to claim 13, further comprising:

a temperature detection unit configured to detect temperature; and a humidity detection unit configured to detect humidity, wherein the conveying unit stops the print media in such a way that a retention period is based on a detection result by the temperature detection unit and a detection result by the humidity detection unit.

18. The printing apparatus according to claim 13, further comprising an input panel to which information on whether to execute the sorting operation is inputted.

19. The printing apparatus according to claim 13, further comprising a connecting unit connectable to an external apparatus that allows input of information on whether to execute the sorting operation.

20. The printing apparatus according to claim 13, wherein a movable member moves in a width direction intersecting a direction in which a print medium is discharged.

21. The printing apparatus according to claim 13, wherein a print medium is discharged onto the stacking unit with a print surface of the print medium facing down.

22. The printing apparatus according to claim 13, further comprising the stacking unit.

* * * * *